(12) United States Patent
Kim et al.

(10) Patent No.: US 10,771,459 B2
(45) Date of Patent: Sep. 8, 2020

(54) TERMINAL APPARATUS, SERVER APPARATUS, BLOCKCHAIN AND METHOD FOR FIDO UNIVERSAL AUTHENTICATION USING THE SAME

(71) Applicant: Electronics and Telecommunications Research Institute, Daejeon (KR)

(72) Inventors: Seok-Hyun Kim, Daejeon (KR);
Sang-Rae Cho, Daejeon (KR);
Young-Seob Cho, Daejeon (KR);
Se-Young Huh, Daejeon (KR);
Soo-Hyung Kim, Daejeon (KR);
Seung-Hyun Kim, Daejeon (KR);
Young-Sam Kim, Daejeon (KR);
Jong-Hyouk Noh, Daejeon (KR);
Jin-Man Cho, Daejeon (KR);
Seung-Hun Jin, Daejeon (KR);
Jung-Yeon Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 215 days.

(21) Appl. No.: 16/117,795

(22) Filed: Aug. 30, 2018

(65) Prior Publication Data

US 2019/0075102 A1 Mar. 7, 2019

(30) Foreign Application Priority Data

Sep. 4, 2017 (KR) .......................... 10-2017-0112775
Jul. 11, 2018 (KR) .......................... 10-2018-0080792

(51) Int. Cl.
*G06F 21/30* (2013.01)
*H04L 9/32* (2006.01)
(Continued)

(52) U.S. Cl.
CPC .......... *H04L 63/0853* (2013.01); *G06F 21/32* (2013.01); *G06F 21/64* (2013.01);
(Continued)

(58) Field of Classification Search
CPC . H04L 9/32; H04L 63/08; H04L 63/12; G06F 21/31; G06F 21/30
(Continued)

(56) References Cited

U.S. PATENT DOCUMENTS 9,231,847 B2 1/2016 Lim
9,503,891 B2 11/2016 Yun et al.
(Continued)

FOREIGN PATENT DOCUMENTS

CA 3008705 A1 10/2017
KR 10-1590076 B1 2/2016
(Continued)

*Primary Examiner* — Izunna Okeke
(74) *Attorney, Agent, or Firm* — NSIP Law

(57) ABSTRACT

Disclosed herein are a terminal apparatus, a server apparatus, and a method for FIDO universal authentication using a blockchain. The method includes sending, by the terminal apparatus, a FIDO service request for any one of FIDO registration, FIDO authentication, and FIDO deregistration for an application service provided by the server apparatus to the server apparatus; verifying, by the blockchain, a FIDO service response message, which is created as a result of local authentication of a user in the terminal apparatus in response to the FIDO service request; and processing, by the server apparatus, the FIDO service request based on whether the FIDO service response message is successfully verified by the blockchain.

18 Claims, 15 Drawing Sheets

(51) Int. Cl.
*H04L 29/06* (2006.01)
*G06F 21/32* (2013.01)
*H04L 9/08* (2006.01)
*H04L 9/06* (2006.01)
*H04L 9/00* (2006.01)
*G06F 21/64* (2013.01)

(52) U.S. Cl.
CPC ............ *H04L 9/006* (2013.01); *H04L 9/0637* (2013.01); *H04L 9/0825* (2013.01); *H04L 9/3239* (2013.01); *H04L 9/3247* (2013.01); *H04L 9/3271* (2013.01); *H04L 63/08* (2013.01); *G06F 2221/2117* (2013.01); *H04L 2209/38* (2013.01)

(58) Field of Classification Search
USPC ................. 713/168, 182, 170, 176; 726/2, 3
See application file for complete search history.

(56) References Cited

U.S. PATENT DOCUMENTS

| | | | |
|---|---|---|---|
| 9,935,953 B1* | 4/2018 | Costigan | ............ H04L 63/0876 |
| 2018/0227293 A1 | 8/2018 | Uhr et al. | |
| 2020/0145219 A1* | 5/2020 | Sebastian | .............. H04W 12/06 |

FOREIGN PATENT DOCUMENTS

| | | |
|---|---|---|
| KR | 10-1661933 B1 | 10/2016 |
| KR | 10-1723405 B1 | 4/2017 |
| KR | 10-1773073 B1 | 8/2017 |
| KR | 10-1829721 B1 | 3/2018 |

* cited by examiner ously by the owner thereof is registered in a server, and the owner is authenticated when authentication using the registered FIDO authentication device succeeds.

TERMINAL APPARATUS, SERVER APPARATUS, BLOCKCHAIN AND METHOD FOR FIDO UNIVERSAL AUTHENTICATION USING THE SAME

CROSS REFERENCE TO RELATED APPLICATIONS

This application claims the benefit of Korean Patent Application No. 10-2017-0112775, filed Sep. 4, 2017, and No. 10-2018-0080792, filed Jul. 11, 2018, which are hereby incorporated by reference in their entirety into this application.

BACKGROUND OF THE INVENTION

1. Technical Field

The present invention relates generally to authentication technology, and more particularly to universal authentication using Fast Identity Online (FIDO) authentication and blockchain security technology.

2. Description of the Related Art

Thanks to the development of Internet technology and mobile devices, various types of application services are being used. In order to securely use such application services, it is necessary to apply a strong user-authentication means. However, an authentication method based on IDs and passwords, which is vulnerable to security threats, is still being used in most application services, excluding application services in the financial field, because service providers may easily implement the same. Service providers that adopt the authentication method based on IDs and passwords impose complex password rules and advise users to change their passwords at regular intervals.

However, it is difficult for a user to use different passwords for respective sites and to periodically change his or her password in order to securely use services. In order to ease such inconvenience, most users use multiple application services using only a small number of IDs and passwords that are easy to remember. Accordingly, when IDs and passwords of users of a certain application service are leaked due to cyberattacks, a serious security problem may arise because not only information pertaining to the corresponding application service but also information pertaining to other application services may be leaked.

In order to solve the problems with the user authentication method based on IDs and passwords, the Fast Identity Online (FIDO) standard was released in 2014. Many global companies, such as Google, Microsoft, Samsung, and the like, are involved in establishing the FIDO standard, and currently, many financial institutions and certificate authorities worldwide adopt FIDO technology in order to provide a user authentication service based thereon.

The idea of FIDO technology is to authenticate a user using an authentication device possessed by the user, rather than directly using the authentication information of the user. Specifically, a FIDO authentication device used exclusively by the owner thereof is registered in a server, and the owner is authenticated when authentication using the registered FIDO authentication device succeeds.

FIG. 1 is a view that shows a FIDO authentication process.

Referring to FIG. 1, a user may authenticate locally to a terminal device, which is a FIDO authentication device, in order to verify that the user is registered therein. Here, the local authentication process may be the method of authenticating the user using a fingerprint recognition function in a smart terminal. Here, the user may select any of various authentication methods supported by the smart terminal, such as fingerprint recognition, iris recognition, face recognition, voice recognition, and the like. That is, because no one other than the user can use the user terminal device and use the same as a FIDO authentication device, local authentication may be used in order to check whether the user is authentic.

A FIDO authentication device and a FIDO server may use a FIDO Universal Authentication Framework (UAF) protocol for authentication therebetween, and the FIDO UAF protocol may use Public Key Infrastructure (PM). Here, PKI requires a key pair comprising a private key for signing and a public key, and the FIDO authentication device may autonomously create and manage such a key pair when local authentication of a user is successfully completed.

Also, the FIDO authentication device may register the created public key in the FIDO server using the FIDO UAF protocol. Then, when authentication is performed, the FIDO authentication device may sign information required for authentication using the private key managed by itself, and the FIDO server may verify whether the signed information is trusted using the public key previously registered therein.

FIG. 2 is a view that shows the scenario of FIDO authentication technology.

Referring to FIG. 2, in order to use a FIDO authentication service provided by different application services (online banking, stock exchanges, insurance, and the like) in various domains, a user must perform FIDO registration processes individually for all of the application services. Each time a registration process is performed, private and public keys of the user are created for each application service of a FIDO authentication device, the created public key is registered in each authentication server, and the created private key is securely managed in the FIDO authentication device, which is a user terminal device. That is, when a user wants to use 100 sites that support a FIDO authentication service, the user must perform a FIDO registration process 100 times, and 100 private keys must be stored in the FIDO authentication device of the user. If the user wants to use two FIDO authentication devices in 100 sites, the user must perform the process of registering a FIDO authentication device 200 times. Furthermore, because the FIDO authentication device is based on hardware, there may be a problem related to storage for storing the private keys of the user, and the process of registering the FIDO authentication device in each site frustrates the user.

In order to solve the problem of the storage of a FIDO authentication device and to ease users' inconvenience arising from the repeated FIDO registration processes, multiple application sites may share FIDO authentication information of users. However, it is not easy to share information between different services in practice. For example, in order to enable company B to use the information of a user registered in company A, a trusted third party may be required, which may incur additional expenses. If the involved parties directly share information therebetween without a trusted third party, many difficult problems related to consultation processes, system operation, appointment of the main agent of management and maintenance, and the like must be solved. Particularly, it is difficult to decide who will be responsible for security problems and to guarantee the reliability of data. Therefore, it is not easy to solve the problem of sharing user information with another domain.

Recently, blockchain security technology, in which all participants in a network may verify, record, and manage transactions in common, has received a lot of attention. In a blockchain, it is impossible to tamper with transactions unless all participants in a network are hacked, because the transaction ledger is distributed among all of the participants. Therefore, the reliability of transaction records may be secured without any trusted third party. Transaction information may be configured as two types: general data and a program having a certain purpose (hereinafter, referred to as 'smart contract'). The program on the blockchain may record or update information in a block of the blockchain only when the information simultaneously verified by all participant nodes is determined to be valid. Accordingly, in spite of the absence of a trusted third party, all of the nodes participating in the network may trust and use information recorded in the block through the program.

If a sharing model based on blockchain technology can be used to share FIDO authentication information of users between application services of multiple domains, users do not have to repeat a FIDO registration process, whereby user convenience may be improved. Also, service providers may share FIDO authentication information of users and FIDO authentication functions without a trusted third party, whereby the expenses of maintaining a FIDO server and security management costs may be reduced significantly.

Meanwhile, Korean Patent No. 10-1829721, titled "Method for certifying user using mobile ID through blockchain and terminal and server using the same", discloses a method for registering a user certificate in a public blockchain database and using the registered user certificate through an authentication server.

However, Korean Patent No. 10-1829721 does not mention a method for accessing the user certificate registered in the blockchain database through an application server other than the authentication server.

SUMMARY OF THE INVENTION

An object of the present invention is to enable application services of multiple domains to securely share and use FIDO authentication information of a user without any trusted third party.

Another object of the present invention is to provide FIDO authentication of a user in all application services without an additional FIDO registration process once the user performs a FIDO registration process.

A further object of the present invention is to reduce the expenses of maintaining a server of a service provider that provides an application service and security management cost through FIDO registration and authentication processes using a FIDO blockchain.

Yet another object of the present invention is to enable respective application services to provide individual FIDO registration and authentication policies.

Still another object of the present invention is to enable FIDO authentication information of a user to be trusted by all nodes using a FIDO blockchain without a trusted third party.

Still another object of the present invention is to create added value by sharing FIDO authentication information of users between application services through a FIDO blockchain.

In order to accomplish the above objects, a method for FIDO universal authentication using a terminal apparatus, a server apparatus, and a blockchain according to an embodiment of the present invention includes sending, by the terminal apparatus, a FIDO service request for any one of FIDO registration, FIDO authentication, and FIDO deregistration for an application service provided by the server apparatus to the server apparatus; verifying, by the blockchain, a FIDO service response message, which is created as a result of local authentication of a user in the terminal apparatus in response to the FIDO service request; and processing, by the server apparatus, the FIDO service request based on whether the FIDO service response message is successfully verified by the blockchain.

Here, sending the FIDO service request may be configured such that the server apparatus requests the blockchain to retrieve FIDO authentication information of the user, corresponding to the terminal apparatus, by providing basic information about the user, which the terminal apparatus provides in order to sign up for the application service, to the blockchain.

Here, sending the FIDO service request may be configured such that the server apparatus acquires the basic information about the user from a user database, which is included in the server apparatus, using identification information of the user, which the terminal apparatus provides in order to log on to the application service.

Here, sending the FIDO service request may be configured such that the server apparatus retrieves the FIDO authentication information of the user from the user database when it is determined that the FIDO authentication information of the user is stored therein using the identification information of the user, and such that the server apparatus requests the blockchain to retrieve the FIDO authentication information of the user only when it is determined that the FIDO authentication information is not stored in the user database.

Here, sending the FIDO service request may be configured such that the blockchain creates a blockchain identifier using the basic information about the user.

Here, sending the FIDO service request may be configured such that the blockchain retrieves the FIDO authentication information of the user from a blockchain database and creates an authentication information list that includes credential identifiers associated with the blockchain identifier, which are acquired from the FIDO authentication information of the user.

Here, sending the FIDO service request may be configured such that the server apparatus retrieves the FIDO authentication information of the user from the user database and creates an authentication information list that includes credential identifiers associated with the identification information of the user, which are acquired from the FIDO authentication information of the user.

Here, verifying the FIDO service response message may be configured such that the terminal apparatus checks whether a credential identifier thereof is included in the authentication information list, performs local authentication of the user, and creates information based on a type of the FIDO service request and on a result of checking whether the credential identifier is included in the authentication information list.

Here, verifying the FIDO service response message may be configured such that, when the FIDO service request is a request for FIDO registration and when the credential identifier is not included in the authentication information list, the terminal apparatus performs local authentication of the user, creates a new public key, signs the new public key with an inherent private key of the terminal apparatus, and creates the FIDO service response message, including the new public key and the identification information of the user.

Here, verifying the FIDO service response message may be configured such that, when the FIDO service request is a request for FIDO authentication or FIDO deregistration and when the credential identifier is included in the authentication information list, the terminal apparatus performs local authentication of the user, creates an electronic signature signed with a private key associated with the credential identifier, and creates the FIDO service response message, including the electronic signature and the credential identifier.

Here, processing the FIDO service request may be configured such that the blockchain acquires information that is required for verifying second information included in the FIDO service response message from the blockchain database using first information included in the FIDO service response message and verifies the FIDO service response message by verifying the second information using the acquired information.

Here, the blockchain database may store metadata information, which is previously provided from the terminal apparatus, as two types and store the FIDO authentication information of the user as two types.

Here, the blockchain database may store a string for requesting retrieval of a unique identifier of the terminal apparatus and a list of unique identifiers matching the string, which are set as a key and a value, respectively, as a first type of metadata information. Also, the blockchain database may store a unique identifier of the terminal apparatus and an inherent public key of the terminal apparatus corresponding to the unique identifier, which are set as a key and a value, respectively, as a second type of metadata information.

Here, the blockchain database may store the blockchain identifier and a list of credential identifiers corresponding to the blockchain identifier, which are set as a key and a value, respectively, as a first type of the FIDO authentication information of the user. Also, the blockchain database may store the credential identifier and a public key of the terminal apparatus corresponding to the credential identifier, which are set as a key and a value, respectively, as a second type of the FIDO authentication information of the user.

Here, the method may further include creating, by the server apparatus, a blockchain identifier corresponding to the terminal apparatus when verification of the FIDO service response message succeeds.

Here, creating the blockchain identifier may be configured such that the server apparatus creates the blockchain identifier using basic information about the user, which the terminal apparatus provides to the server apparatus in order to sign up for the application service.

Here, creating the blockchain identifier may be configured such that the server apparatus connects the blockchain identifier with the basic information about the user, which is used to create the blockchain identifier, thereby storing the blockchain identifier in a user database included in the server apparatus.

Here, the method may further include, after creating the blockchain identifier, processing, by the server apparatus, the FIDO service request from the terminal apparatus through the blockchain using the blockchain identifier.

In order to accomplish the above objects, a terminal apparatus according to an embodiment of the present invention includes an RP client unit for sending a FIDO service request for any one of FIDO registration, FIDO authentication, and FIDO deregistration for an application service provided by a server apparatus to the server apparatus; and a FIDO authentication unit for performing local authentication of a user in order to enable the server apparatus to process the FIDO service request. Here, the server apparatus may request a blockchain to verify a FIDO service response message, which is created as a result of local authentication of the user, and process the FIDO service request based on a result of verification of the FIDO service response message.

Also, in order to accomplish the above objects, a server apparatus according to an embodiment of the present invention includes a FIDO protocol processing unit for requesting a terminal apparatus to perform local authentication of a user in order to process a FIDO service request from the terminal apparatus, the FIDO service request being for any one of FIDO registration, FIDO authentication, and FIDO deregistration for an application service provided to the terminal apparatus; and a FIDO blockchain unit for requesting a blockchain to verify a FIDO service response message, which is created as a result of local authentication of the user, and processing the FIDO service request based on a result of verification of the FIDO service response message.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
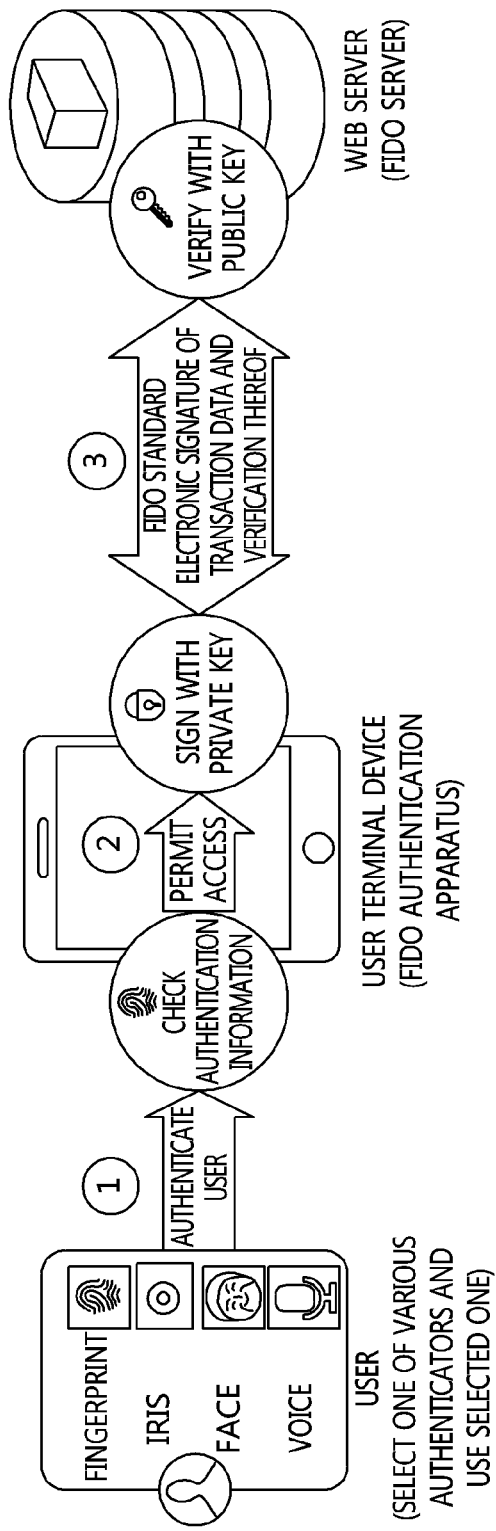
FIG. 1 is a view that shows a Fast Identity Online (FIDO) authentication process.
Figure 2:
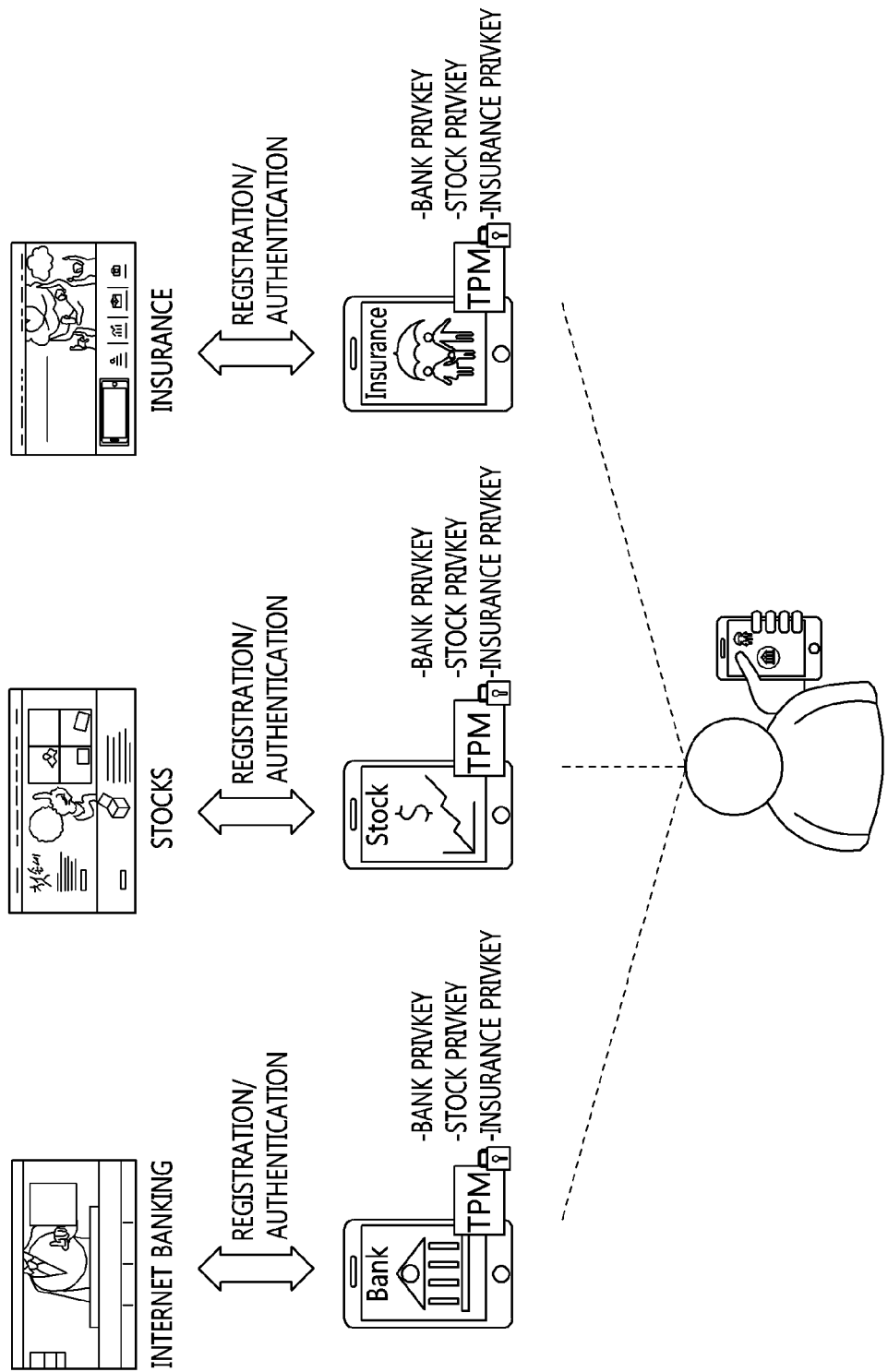
FIG. 2 is a view that shows a scenario of FIDO authentication.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 3:
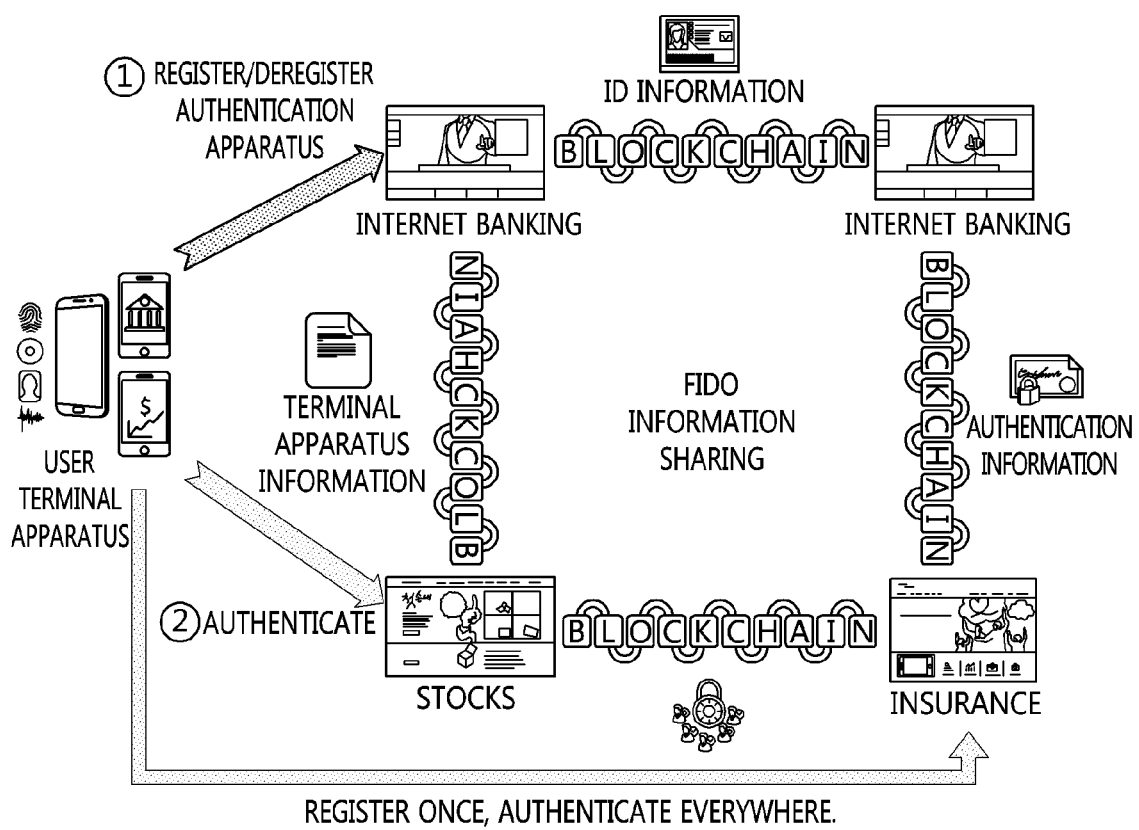
FIG. 3 is a view that shows a system for FIDO universal authentication according to an embodiment of the present invention.

FIG. 3 is a view that shows a system for FIDO universal authentication according to an embodiment of the present invention.

Referring to FIG. 3, the system for FIDO universal authentication according to an embodiment of the present invention may securely share FIDO authentication information of a user, which is created from the user terminal apparatus 100 of the user.

Here, the user terminal apparatus 100 may securely share FIDO authentication information between application services of multiple domains (internet banking, stock exchanges, insurance, and the like) using a FIDO blockchain 300 without a trusted third party.

Accordingly, once registered in the FIDO blockchain 300, a user may perform FIDO authentication for application services of multiple domains without an additional registration process. Therefore, inconvenience arising from repeated FIDO registration processes may be overcome, and a service provider may reduce the expenses of directly maintaining a FIDO authentication server and security management costs.

That is, in the system for FIDO universal authentication according to an embodiment of the present invention, once registered in the blockchain 300, a user may authenticate with multiple application services linked with the FIDO blockchain 300, and the reliability of user's FIDO authentication information, which is shared through the FIDO blockchain 300, and the reliability of a FIDO authentication program may be guaranteed through the FIDO blockchain 300.

Figure 4:
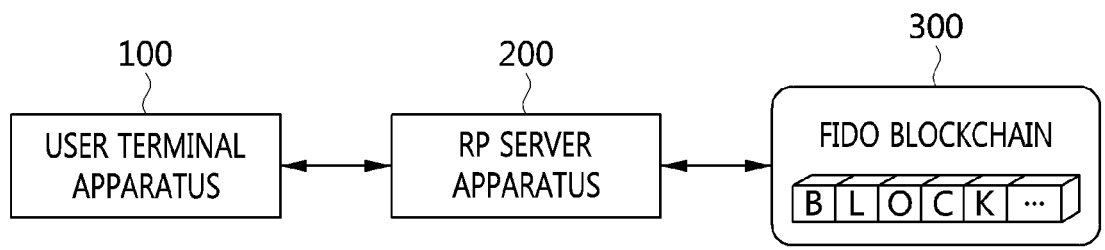
FIG. 4 is a block diagram that shows a system for FIDO universal authentication according to an embodiment of the present invention.
Figure 5:
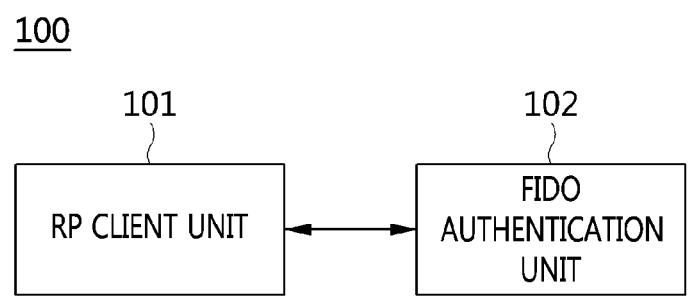
FIG. 5 is a block diagram that shows a user terminal apparatus according to an embodiment of the present invention.
Figure 6:
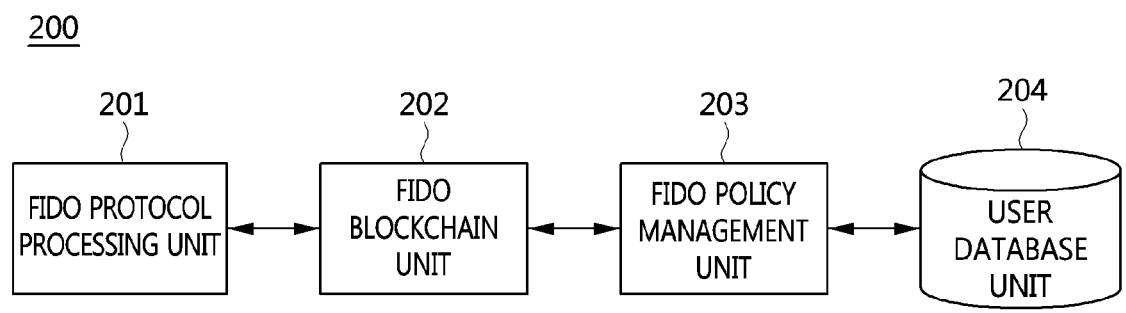
FIG. 6 is a block diagram that shows a Relying-Party (RP) server apparatus according to an embodiment of the present invention.
Figure 7:
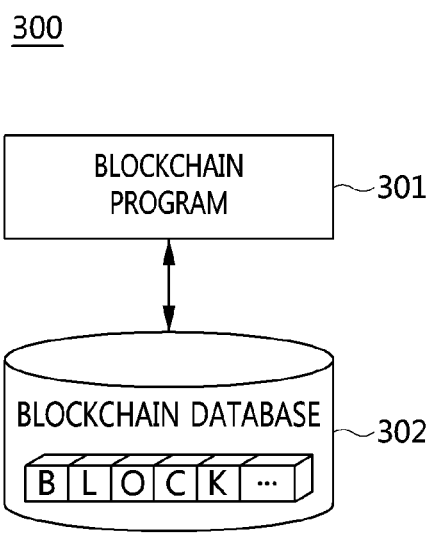
FIG. 7 is a block diagram that shows a FIDO blockchain according to an embodiment of the present invention.
Figure 8:
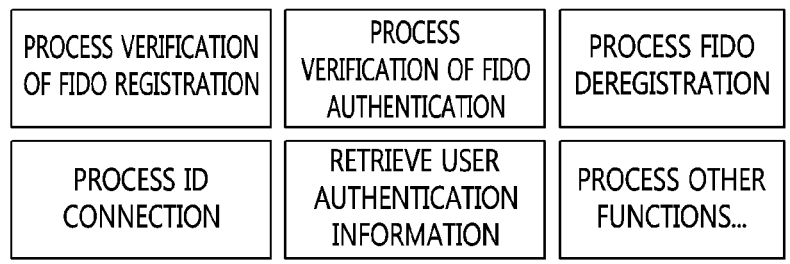
FIG. 8 is a view that shows functions performed by the blockchain program illustrated in FIG. 7.

FIG. 4 is a block diagram that shows a system for FIDO universal authentication according to an embodiment of the present invention. FIG. 5 is a block diagram that shows a user terminal apparatus according to an embodiment of the present invention. FIG. 6 is a block diagram that shows a Relying-Party (RP) server apparatus according to an embodiment of the present invention. FIG. 7 is a block diagram that shows a FIDO blockchain according to an embodiment of the present invention. FIG. 8 is a view that shows functions and subprograms included in the blockchain program illustrated in FIG. 7.

Referring to FIG. 4, the system for FIDO universal authentication according to an embodiment of the present invention includes a user terminal apparatus 100, an RP server apparatus 200, and a FIDO blockchain 300.

The user terminal apparatus 100 may be a terminal device (a mobile device such as a smartphone, a smart pad, or the like), a computing device, or the like that is capable of locally authenticating a user based on FIDO.

A user may locally authenticate with the user terminal apparatus using any one of a biometric authentication method, such as fingerprint recognition, iris recognition, face recognition, and the like, a security token method, and the like.

The RP server apparatus 200 runs a FIDO protocol, and may be the server device of a Relying Party (RP) that provides an application service to a user through the user terminal apparatus 100.

Here, the RP server apparatus 200 may create a message for requesting a FIDO operation based on previously stored policies on FIDO registration/authentication, use the FIDO blockchain 300 to verify and process a FIDO operation response message, and perform an additional procedure depending on the verification result.

The FIDO blockchain 300 may record data related to FIDO, including metadata information of the user terminal apparatus 100 and FIDO authentication information of a user, in a transaction ledger of each node of a blockchain network, thereby providing a program (smart contract) that is capable of processing various functions, such as registering, authenticating, and deregistering data related to FIDO, connecting the data with the identifier of the user, retrieving data, and the like.

To this end, the FIDO blockchain 300 may record and manage the metadata information of the user terminal apparatus 100 and the FIDO authentication information of the user in a blockchain database 302.

The user terminal apparatus 100 may send a FIDO service request for any one of FIDO registration, FIDO authentication, and FIDO deregistration to the RP server apparatus 200.

The RP server apparatus 200 may request the FIDO blockchain 300 to retrieve authentication information in order to process the FIDO service request for any one of FIDO registration, FIDO authentication, and FIDO deregistration, which is received from the user terminal apparatus 100.

Here, the user terminal apparatus 100 may perform local authentication of the user based on the result of retrieval by the FIDO blockchain 300.

Here, when local authentication of the user succeeds, the user terminal apparatus 100 may send a FIDO operation response message that is created as the result of local authentication of the user to the RP server apparatus 200.

Here, the RP server apparatus 200 may request the FIDO blockchain 300 to verify the FIDO operation response message and process the FIDO service request from the user terminal apparatus 100 based on whether the FIDO operation response message is successfully verified by the FIDO blockchain 300.

Referring to FIG. 5, the user terminal apparatus 100 according to an embodiment of the present invention includes an RP client unit 101 and a FIDO authentication unit 102.

The RP client unit 101 may send a FIDO service request for any one of FIDO registration, FIDO authentication, and FIDO deregistration to the RP server apparatus 200, which requests the FIDO blockchain 300 to retrieve authentication information.

Here, the RP client unit 101 may provide the identification information of a user by logging on to the application service of the RP server apparatus 200.

The identification information of the user may include at least one of the identifier of the user in the service, the device identifier of the user terminal apparatus 100, and the unique identifier of the user terminal apparatus 100.

Here, the string for requesting the unique identifier of the user terminal apparatus 100 may be an AAGUID.

Here, an Authenticator Attestation Globally Unique Identifier (AAGUID) may be a string for requesting the unique identifier of a FIDO-based terminal device provided by FIDO authentication technology.

The unique identifiers of user terminal apparatuses 100 may be stored in advance in the blockchain database 302 of the FIDO blockchain 300 as metadata information.

Here, the RP client unit 101 may receive a FIDO operation request message from the RP server apparatus 200.

The FIDO operation request message may include information that is necessary when a FIDO operation response message is created.

For example, the FIDO operation request message may include an authentication information list, which is created as the result of retrieval of the FIDO authentication information of the user in response to the FIDO service request, information related to FIDO registration/authentication policies, a random challenge value, and the like.

The FIDO registration/authentication policies may include information about the cryptographic algorithm of the user terminal apparatus 100 acceptable by an application service, response latency, the connection type of the user terminal apparatus 100, a list of unique identifiers of the user terminal apparatus 100 allowed for registration and authentication, and the like.

Here, the RP client unit 101 may receive the FIDO operation request message from the RP server apparatus 200 and send the same to the FIDO authentication unit 102. Also, the RP client unit 101 may receive the FIDO operation response message from the FIDO authentication unit 102 and deliver the same to the RP server apparatus 200.

The FIDO authentication unit 102 may perform local authentication of a user.

Here, the FIDO authentication unit 102 may perform local authentication of a user using an authentication method supported by the user terminal apparatus 100, such as a biometric authentication method, such as fingerprint recognition, iris recognition, face recognition, or the like, a security token method, or the like.

Here, when it performs a FIDO registration operation, the FIDO authentication unit 102 may check whether a previously created credential identifier is included in the authentication information list.

Here, when a credential identifier matching the credential identifier previously created by the user terminal apparatus 100 is found in a disallowed user list in the authentication information list, the FIDO authentication unit 102 may determine that the user terminal apparatus 100 of the same user is already registered in the FIDO blockchain 300, and may thus create a FIDO registration request denial message.

Conversely, when a credential identifier matching the credential identifier previously created by the user terminal apparatus 100 is not found in the disallowed user list in the authentication information list, the FIDO authentication unit 102 may determine that the user terminal apparatus 100 of the user is not registered in the FIDO blockchain 300, and may perform local authentication of the user.

Here, when local authentication of the user in the user terminal apparatus 100 succeeds, the FIDO authentication unit 102 may create authentication information (a pair comprising a new private key and a new public key) for the user.

Here, the FIDO authentication unit 102 may sign the new public key, created as the authentication information of the user, with an inherent private key of the user terminal apparatus 100.

The user terminal apparatus 100 may include the inherent private key and an inherent public key, which were created when it came out of the factory, and the inherent public key of the user terminal apparatus 100 may be shared in advance with the FIDO blockchain 300 and stored as a metadata statement in the blockchain database 302.

Here, the FIDO authentication unit 102 may create a FIDO registration response message that includes the new signed public key, the identifier of the new public key (a new credential identifier), and the identification information of the user.

Also, when the FIDO authentication unit 102 performs a FIDO authentication or deregistration operation, if a credential identifier matching the credential identifier previously created by the user terminal apparatus 100 is not found in an allowed user list in the authentication information list, the FIDO authentication unit 102 may determine that the user terminal apparatus 100 of the user is not registered in the FIDO blockchain 300, and may thus create a FIDO authentication request denial message.

Conversely, when a credential identifier matching the credential identifier previously created by the user terminal apparatus 100 is found in the allowed user list in the authentication information list, the FIDO authentication unit 102 may determine that the user terminal apparatus 100 of the user is registered in the FIDO blockchain 300, and may perform local authentication of the user.

Here, when local authentication of the user in the user terminal apparatus 100 succeeds, the FIDO authentication unit 102 may create an electronic signature.

For example, when local authentication of the user in the user terminal apparatus 100 succeeds, the FIDO authentication unit 102 may sign the challenge value included in the FIDO authentication request message with the private key associated with the credential identifier, which is found in the allowed user list in the authentication information list.

Here, the FIDO authentication unit 120 may create an electronic signature by signing the challenge value with the private key associated with the credential identifier.

Here, the FIDO authentication unit 120 may create a FIDO authentication response message that includes the credential identifier and the electronic signature.

Here, the FIDO authentication unit 120 may create a FIDO authentication response message that further includes information ('True' or 'False') about whether local authentication of the user is performed if the FIDO authentication request message specifies local authentication.

Also, the RP client unit 101 may check the result of the FIDO service request by receiving a FIDO service success message from the RP server apparatus 200 as the result of verification of the FIDO operation response message.

Referring to FIG. 6, the RP server apparatus 200 according to an embodiment of the present invention includes a FIDO protocol processing unit 201, a FIDO blockchain unit 202, a FIDO policy management unit 203, and a user database unit 204.

The FIDO protocol processing unit 201 may receive a FIDO service request for any one of FIDO registration, FIDO authentication, and FIDO deregistration from a user terminal apparatus 100.

Here, the FIDO protocol processing unit 201 may create a FIDO operation request message related to the received FIDO service request.

Here, the FIDO protocol processing unit 201 may receive the identification information of a user from the user terminal apparatus 100.

The identification information of the user may include at least one of the identifier of the user in a service, the device identifier of the user terminal apparatus 100, and the unique identifier of the user terminal apparatus 100.

Here, the FIDO protocol processing unit 201 may acquire basic information about the user from the user database unit 204 using the identification information of the user, which the user terminal apparatus 100 provides thereto in order to log on to the application service.

The basic information about the user may include at least one of the birthdate, the sex, the name, and the like of the user, which are commonly used in application services provided by other RP server apparatuses 200.

Also, the FIDO protocol processing unit 201 may retrieve a blockchain identifier and the FIDO authentication information of the user, which are connected with the basic information about the user, from the user database unit 204.

When the blockchain identifier and the authentication information of the user, which are connected with the basic information of the user, are not found in the user database unit 204, the FIDO protocol processing unit 201 may request the FIDO blockchain unit 202 to retrieve the FIDO authentication information of the user.

The FIDO blockchain unit 202 may request the FIDO blockchain 300 to retrieve the FIDO authentication information of the user.

The FIDO authentication information of the user may include at least one of a blockchain identifier, the unique identifier of the user terminal apparatus 100, a credential identifier, a public key associated with the credential identifier, a signature counter, a registration time, an authentication time, the type of the credential identifier, information connected with the credential identifier, and the like, which are various kinds of information related to authentication to be included in a FIDO operation response message.

Here, the credential identifier, which is the identifier of the public key of the user terminal apparatus 100, may be an identification value for the public key. The user terminal apparatus 100 creates the public key such that the uniqueness thereof is guaranteed.

Here, the FIDO blockchain unit 202 hashes the basic information about the user, thereby creating a hash value (userHash) of the basic information.

For example, the FIDO blockchain unit 202 may create a hash value using the birthdate and sex of the user, which are included in the basic information about the user, and the device identifier of the user terminal apparatus 100 (userHash=(birthdate+sex|deviceID)).

Here, various hash functions, such as SHA256 and the like, may be used as a hash algorithm.

Here, the FIDO blockchain unit 202 may provide the hash value and the string (AAGUID) of the unique identifier of the user terminal apparatus 100 to the user authentication information retrieval program 301a of the FIDO blockchain 300.

Here, the FIDO protocol processing unit 202 may receive an authentication information list created by the FIDO blockchain 300 and create a FIDO registration request message or a FIDO authentication request message using the authentication information list and a FIDO registration policy or a FIDO authentication policy.

Here, when it creates a FIDO registration request message, the FIDO protocol processing unit 202 may set a disallowed user list in the authentication information list of the FIDO registration request message.

The disallowed user list may be set so as to include the credential identifiers included in the authentication information list in order to prevent the user terminal apparatus 100 of the same user from being registered again.

Also, when it creates a FIDO authentication request message, the FIDO protocol processing unit 202 may create a FIDO authentication request message, including a random challenge value, using the authentication information list and the FIDO authentication policy.

Here, the FIDO protocol processing unit 202 may create a FIDO authentication request message by setting an allowed user list in the authentication information list.

The allowed user list may be set so as to include the credential identifiers included in the authentication information list in order to allow authentication using only the user terminal apparatus 100 of the same user.

Here, the FIDO protocol processing unit 202 may send the created FIDO operation request message to the user terminal apparatus 100.

Also, the FIDO protocol processing unit 202 may receive a FIDO operation response message from the user terminal apparatus 100 in response to the FIDO operation request message.

Here, the FIDO protocol processing unit 201 may verify a session and the FIDO operation response message.

Here, the FIDO protocol processing unit 201 may verify the session information of the received FIDO operation response message.

Also, the FIDO blockchain unit 202 may request the FIDO blockchain 300 to verify the received FIDO operation response message.

Here, when the FIDO operation response message is successfully verified by the FIDO blockchain 300, the FIDO blockchain unit 202 may receive a FIDO service success message.

Here, the FIDO protocol processing unit 201 may confirm that the FIDO service request of the user terminal apparatus 100 is successfully processed by checking the FIDO service success message, and may send the FIDO service success message to the user terminal apparatus 100.

Also, when it receives the FIDO service success message, the FIDO blockchain unit 202 may create a blockchain identifier and FIDO authentication information of the user.

Here, the FIDO blockchain unit 202 may create a blockchain identifier using the same method as the method that was used when the FIDO blockchain 300 created a blockchain identifier.

That is, the FIDO blockchain unit 202 may hash the basic information about the user, thereby creating a hash value (userHash) of the basic information.

For example, the FIDO blockchain unit 202 may create a hash value (userHash) using the birthdate and sex of the user, which are included in the basic information about the user, and the device identifier of the user terminal apparatus 100 (userHash=(birthdate+sex|the deviceID).

Here, the FIDO blockchain unit 202 may create a blockchain identifier using the basic information about the user.

For example, the FIDO blockchain unit 202 may create a blockchain identifier by again hashing the hash value of the basic information about the user using the unique identifier of the user terminal apparatus 100 (blockchainID=(userHash|AAGUID)).

Here, various hash functions, such as SHA256 and the like, may be used as a hash algorithm.

Here, the blockchain identifier created by the FIDO blockchain unit 202 may be the same as the blockchain identifier created by the FIDO blockchain 300.

Also, the FIDO blockchain unit 202 may create FIDO authentication information of the user using the blockchain identifier in the same manner as that was used when the FIDO blockchain 300 created FIDO authentication information.

Here, the FIDO blockchain unit 202 may create FIDO authentication information of the user that includes the blockchain identifier, the credential identifier, and the public key associated with the credential identifier (the FIDO authentication information statement of the user).

Here, the FIDO blockchain unit 202 may create FIDO authentication information of the user such that an updated signature counter and an updated authentication time, which are included in the FIDO authentication success message, are incorporated in the FIDO authentication information statement of the user.

Here, the FIDO authentication information of the user, created by the FIDO blockchain unit 202, may be of the same type as the FIDO authentication information of the user stored in the blockchain database 302.

The FIDO blockchain unit 202 may store the blockchain identifier and the FIDO authentication information of the user in the user database unit 204.

Here, the FIDO blockchain unit 202 connects the blockchain identifier with the basic information about the user, thereby storing the same in the user database unit 204.

Here, the FIDO blockchain unit 202 connects the FIDO authentication information of the user with the basic information about the user, thereby storing the same in the user database unit 204.

Also, the FIDO blockchain unit 202 may provide not only a verification message but also information required by respective subprograms included in the blockchain program 301 in order to call the blockchain program 301.

The FIDO policy management unit 203 may deliver FIDO registration, authentication, and deregistration policies recorded in the user database unit 204 to the FIDO protocol processing unit 201 in order to process the FIDO service request from the user terminal apparatus 100.

The FIDO registration, authentication, and deregistration policies may specify a cryptographic algorithm of the user terminal apparatus 100 that is acceptable by the application service, response latency, the connection type of the user terminal apparatus 100, a list of unique identifiers of the user terminal apparatus 100 allowed for registration and authentication, and the like.

The user database unit 204 may store and record FIDO registration, authentication, and deregistration policies, the basic information about a user, and the FIDO authentication information of the user.

Referring to FIG. 7, a FIDO blockchain 300 according to an embodiment of the present invention includes a blockchain program 301 and a blockchain database 302.

The blockchain program 301 may record or delete data in or from the blockchain database 302 only when the data simultaneously verified by all nodes that participate in the FIDO blockchain 300 is determined to be trusted.

Here, the blockchain program 301 may store the metadata information of the user terminal apparatus 100 in the blockchain database 302 in advance, and may retrieve the metadata information in response to a retrieval request.

Here, the blockchain program 301 may retrieve the FIDO authentication information of the user from the blockchain database 302 in response to a retrieval request.

Here, the blockchain program 301 may retrieve the FIDO authentication information of the user from the blockchain database 302 using the basic information about the user.

A hash algorithm may use various hash functions such as SHA256 and the like.

Here, the blockchain program 301 may receive the hash value of the basic information about the user and the string (AAGUID) for requesting the unique identifier of the user terminal apparatus 100 from the RP server apparatus 200.

Here, the blockchain program 301 may create an authentication information list corresponding to the basic information about the user.

Here, the blockchain program 301 may create a blockchain identifier using the basic information about the user.

For example, the blockchain program 301 may create a blockchain identifier using the hash value of the basic information about the user and the string for requesting the unique identifier of the user terminal apparatus 100.

Here, the blockchain program 301 may retrieve unique identifiers matching the string (AAGUID) for requesting the unique identifier of the user terminal apparatus 100 from the blockchain database 302 using the string.

Here, the blockchain program 301 may create one or more blockchain identifiers, the number of which corresponds to the number of unique identifiers, by again hashing the hash value of the basic information about the user using the unique identifiers (blockchainID=(userHash|AAGUID)).

Here, the blockchain program 301 may retrieve credential identifiers associated with all of the created blockchain identifiers and create an authentication information list including the credential identifiers.

The blockchain program 301 may send the authentication information list to the RP server apparatus 200.

Also, the blockchain program 301 may verify a FIDO registration response message or a FIDO authentication response message.

The blockchain program 301 may verify a new public key included in a FIDO registration response message.

Here, the blockchain program 301 may retrieve the metadata information of the user terminal apparatus 100 that created the FIDO registration response message from the blockchain database 302.

For example, the blockchain program 301 may look up a metadata statement from the metadata information stored in the blockchain database 302 using the unique identifier of the user terminal apparatus 100 in the identification information of the user, which is included in the FIDO registration response message.

Here, the blockchain program 301 may acquire the inherent public key of the user terminal apparatus 100, associated with the unique identifier of the user terminal apparatus 100, from the metadata statement.

Here, the blockchain program 301 may verify the signature of the new public key, which is signed with the inherent private key, using the inherent public key.

Here, when the signature of the FIDO registration response message is successfully verified, the blockchain program 301 may determine that the FIDO registration response message is trusted.

Here, the blockchain program 301 may record the FIDO authentication information of the user in the blockchain database 302.

Here, when the new public key included in the FIDO registration response message is successfully verified, the blockchain program 301 may create FIDO authentication information of the user, including the verified new public key, and record the same in the blockchain database 302.

For example, the blockchain program 301 may create a blockchain identifier by again hashing the hash value of the basic information about the user using the unique identifier of the user terminal apparatus 100 in the same manner as described in the process of retrieving authentication information.

Here, the blockchain identifier created by the blockchain program 301 may be the same as that created in the process of retrieving authentication information.

Here, the blockchain program 301 sets the blockchain identifier as a key and sets the new credential identifier corresponding thereto as a value, thereby storing the blockchain identifier and the new credential identifier in the blockchain database 302 as the first type of FIDO authentication information of the user.

Here, the blockchain program 301 sets the new credential identifier as a key and sets the new public key corresponding thereto as a value, thereby storing the new credential identifier and the new public key in the blockchain database 302 as the second type of FIDO authentication information of the user.

Also, the blockchain program 301 may verify the electronic signature included in the FIDO authentication response message.

Here, the blockchain program 301 may retrieve the public key of the user terminal apparatus 100 from the blockchain database 302 using the credential identifier included in the FIDO authentication response message.

For example, the blockchain program 301 may look up the FIDO authentication information statement of the user from the FIDO authentication information of the user stored in the blockchain database 302 using the credential identifier included in the FIDO authentication response message.

Here, the blockchain program 301 may acquire the public key of the user terminal apparatus 100 associated with the credential identifier from the FIDO authentication information statement of the user.

Here, using the acquired public key of the user terminal apparatus 100, the blockchain program 301 may verify the electronic signature that is signed with the private key of the user terminal apparatus 100.

Here, when the electronic signature of the FIDO authentication response message is successfully verified, the blockchain program 301 may determine that the FIDO authentication response message is successfully verified.

Also, the blockchain program 301 may update the FIDO authentication information of the user stored in the blockchain database 302.

Here, when the electronic signature included in the FIDO authentication response message is successfully verified, the blockchain program 301 may update the FIDO authentication information of the user recorded in the blockchain database 302.

Here, the blockchain program 301 may update the signature counter and the authentication time of the FIDO authentication information of the user.

The blockchain database 302 may store, record, update, or delete the metadata information and the FIDO authentication information of the user.

Here, the blockchain database 302 may store the metadata information, which is provided from the user terminal apparatus 100 in advance, as two types, and may store the FIDO authentication information of the user as two types.

Here, the blockchain database 302 may store the metadata information and the FIDO authentication information of the user as a pair comprising a key and a value.

The blockchain database 302 may output a value corresponding to a key when the key is input thereto.

Here, the blockchain database 302 sets a string for requesting the unique identifier of the user terminal apparatus 100 as a key and sets a list of unique identifiers matching the string as a value, thereby storing the same as the first type of metadata information. Also, the blockchain database 302 sets the unique identifier of the user terminal apparatus 100 as a key and sets the inherent public key of the user terminal apparatus 100 corresponding thereto as a value, thereby storing the same as the second type of metadata information.

Here, the blockchain database 302 sets a blockchain identifier as a key and sets a list of credential identifiers corresponding thereto as a value, thereby storing the same as the first type of FIDO authentication information of the user. Also, the blockchain database 302 sets a credential identifier as a key and sets the FIDO authentication information statement of the user corresponding thereto as a value, thereby storing the same as the second type of FIDO authentication information of the user.

The FIDO authentication information statement of the user may include at least one of a public key associated with a credential identifier, a signature counter, an authentication time, the type of credential identifier, information connected with the credential identifier, and the like.

Table 1 shows metadata information and FIDO authentication information of a user stored in the blockchain database 302 according to an embodiment of the present invention.

TABLE 1

| Type | attribute | description |
| --- | --- | --- |
| first type of metadata information (unique identifier list) | key | string for requesting unique identifier, 'AAGUID' |
| | value | list of unique identifiers of user terminal apparatus |
| second type of metadata information (metadata) | key | unique identifier of user terminal apparatus |
| | value | metadata information statement (public key corresponding to unique identifier) |
| first type of FIDO authentication information of user (credential identifier list) | key | blockchain identifier of user |
| | value | list of credential identifiers |
| second type of FIDO authentication information of user (authentication information of user) | key | credential identifier of user |
| | value | FIDO authentication information statement corresponding to credential identifier (public key corresponding to credential identifier) |

For example, the first type of metadata information may be recorded as ('AAGUID', '[aaguid1, aaguid2, aaguid3]').

The second type of metadata information may be recorded as ('aaguid1': 'aaguid1', '{'publicKey':'zdfsd_dfs', 쳏}').

The first type of FIDO authentication information of a user may be recorded as ('blockchainid1', '[credential_jd1, credential_jd2]').

The second type of FIDO authentication information of the user may be recorded as ('credential_id1', '{'publicKey': 'adfxid_asdf', 쳏}').

Here, the blockchain program 301 may check whether the signature of the FIDO authentication response message, which is received from the RP server apparatus 200, is authentic, and may update the FIDO authentication information of the user based on the result of verification. The updated authentication information may be the signature counter and the authentication time. The authentication time may be updated to the current time only when local authentication of the user is performed.

Also, the blockchain program 301 may delete the FIDO authentication information of the user from the blockchain database 302 by setting the blockchain identifier of the user and the identifier of the FIDO public key of the user, which are received from the RP server apparatus 200, as keys and inputting the keys.

Here, the blockchain program 301 may set the blockchain identifier as a key and delete a list of credential identifiers, which is the value corresponding thereto.

Here, the blockchain program 301 may set the credential identifier as a key and delete the public key corresponding thereto, which is the FIDO authentication information statement of the user corresponding to the credential identifier.

Referring to FIG. 8, the functions performed by the blockchain program 301 in FIG. 7 are illustrated.

The blockchain program 301 may perform the function of retrieving or recording FIDO authentication information of a user from or in the blockchain database 302, the function of retrieving or recording metadata information of the user terminal apparatus 100, the function of creating a blockchain identifier of the user, the function of verifying FIDO registration with regard to a FIDO registration response message, the function of verifying FIDO authentication with regard to a FIDO authentication response message, the function of deleting FIDO authentication information of a user in response to a request for FIDO deregistration, and other functions.

Here, a FIDO registration response verification program requires basic information about a user, a FIDO authentication response verification program requires explicit information about whether user authentication is performed, and a FIDO deregistration program requires the blockchain identifier of a user and the public key identifier (credential ID) of the user.

The method of running the blockchain program 301 may be decided by the RP server apparatus 200. For example, the RP server apparatus 200 may call the blockchain program 301 using any of various methods, such as a Remote Procedure Call (RPC), a Command Line Interface (CLI), and the like.

Figure 9:
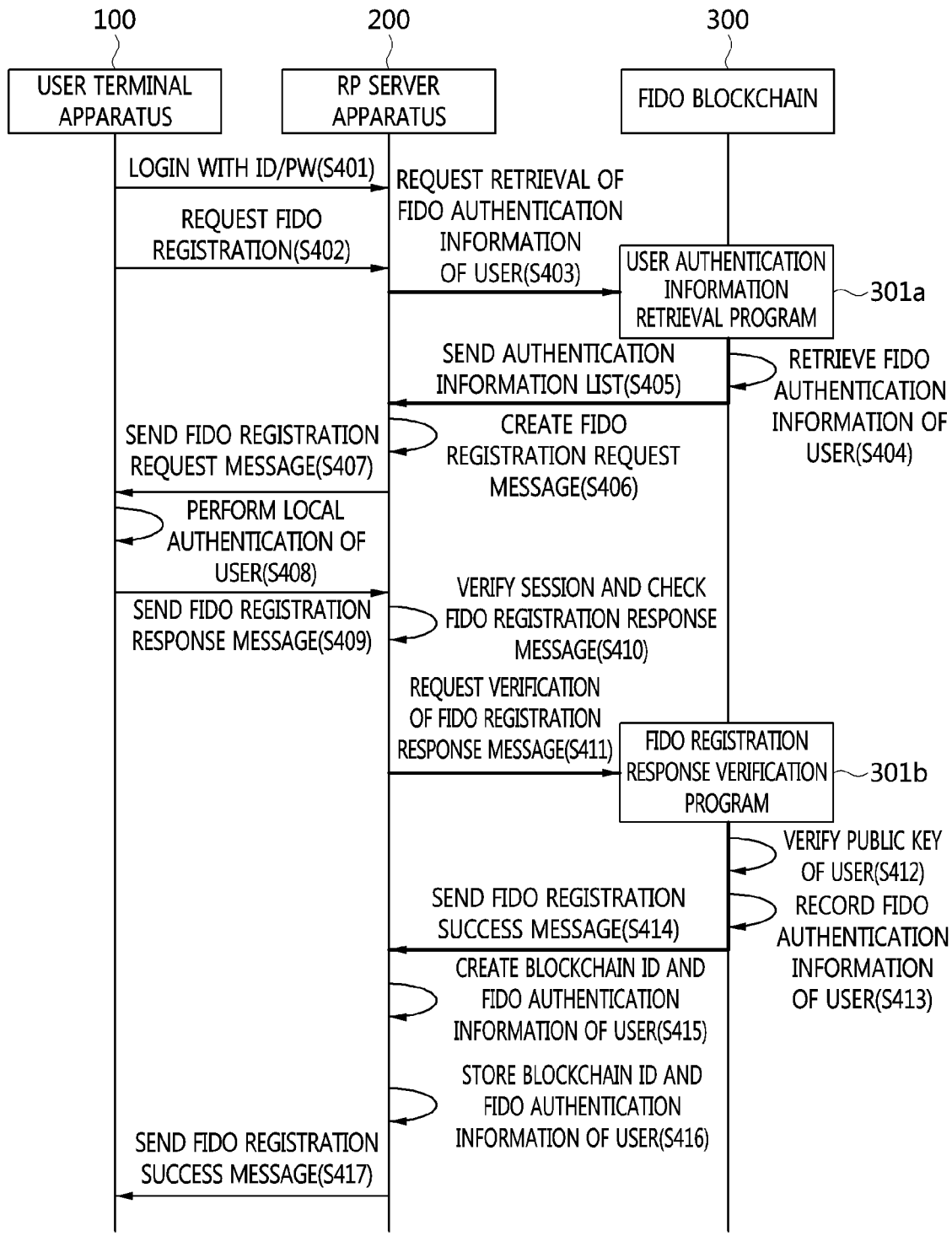
FIG. 9 is a flowchart that shows a FIDO registration process in a FIDO universal authentication method according to an embodiment of the present invention.

FIG. 9 is a flowchart that shows a FIDO registration process in a method for FIDO universal authentication according to an embodiment of the present invention.

Referring to FIG. 9, in the FIDO registration process in the method for FIDO universal authentication according to an embodiment of the present invention, first, a user terminal apparatus 100 may log on to an application service provided by an RP server apparatus 200 at step S401.

That is, at step S401, the user terminal apparatus 100 may log on to the application service using the login method that was used at the time of initial sign up for the application service provided by the RP server apparatus 200, among login methods provided by the user terminal apparatus 100, for example, an ID/password method, an accredited certificate, a One-Time Password (OTP), and the like.

At step S402, the user terminal apparatus 100 may send a request for FIDO registration to the RP server apparatus 200.

Here, at step S402, the user terminal apparatus 100 may provide the identification information of the user by logging on to the application service of the RP server apparatus 200.

The identification information of the user may include at least one of the identifier of the user in the service, the device identifier of the user terminal apparatus 100, and the unique identifier of the user terminal apparatus 100.

The string for requesting the unique identifier of the user terminal apparatus 100 may be defined as 'AAGUID'.

Here, an Authenticator Attestation Globally Unique Identifier (AAGUID) may be a string for requesting the unique identifier of a FIDO-based terminal device provided based on FIDO authentication technology.

The unique identifiers of user terminal apparatuses 100 may be stored in advance in the blockchain database 302 of a FIDO blockchain 300 as metadata information.

At step S403, the RP server apparatus 200 may call a user authentication information retrieval program 301, which is provided by the FIDO blockchain 300, in order to check whether the user who requested FIDO registration is already registered in the FIDO blockchain 300.

Here, at step S403, basic information about the user, which the user terminal apparatus 100 provided when signing up for the application service, is provided to the FIDO blockchain 300, and the user authentication information retrieval program 301a may be called.

The basic information about the user may include at least one of the birthdate, the sex, the name, and the like of the user, which are commonly used in application services provided by other RP server apparatuses 200.

Here, at step S403, the basic information about the user may be acquired from the user database unit 204 included in the RP server apparatus 200 using the identification information of the user, which the user terminal apparatus 100 provided to the RP server apparatus 200 in order to log on to the application service.

At step S404, the user authentication information retrieval program 301a may retrieve FIDO authentication information of the user, corresponding to the basic information about the user.

The FIDO authentication information of the user may include at least one of a blockchain identifier, the unique identifier of the user terminal apparatus 100, a credential identifier, a public key associated with the credential identifier, a signature counter, a registration time, an authentication time, the type of the credential identifier, information connected with the credential identifier, and the like, which are various kinds of information related to authentication to be included in a FIDO service response message.

Here, at step S404, the RP server apparatus 200 hashes the basic information about the user, thereby creating a hash value (userHash) thereof.

For example, at step S404, a hash value (userHash) may be created using the birthdate and sex of the user, which are included in the basic information about the user, and the device identifier of the user terminal apparatus 100 (userHash=(birthdate+sex|deviceID)).

Here, various hash functions, such as SHA256 and the like, may be used as a hash algorithm.

Here, at step S404, the RP server apparatus 200 may provide the hash value of the basic information about the user and the string (AAGUID) for requesting the unique identifier of the user terminal apparatus 100 to the user authentication information retrieval program 301a of the FIDO blockchain 300.

Here, at step S404, the user authentication information retrieval program 301a may create an authentication information list corresponding to the basic information about the user.

Here, at step S404, the FIDO blockchain 300 may create a blockchain identifier using the basic information about the user.

For example, the FIDO blockchain 300 may create a blockchain identifier using the hash value of the basic information about the user and the string for requesting the unique identifier of the user terminal apparatus 100 at step S404.

Here, at step S404, unique identifiers matching the string for requesting the unique identifier may be retrieved from the blockchain database 302 using the string for requesting the unique identifier of the user terminal apparatus 100.

Here, at step S404, one or more blockchain identifiers, the number of which corresponds to the number of unique identifiers, may be created by again hashing the hash value of the basic information about the user using the unique identifiers (blockchainID=(userHash|AAGUID)).

Here, at step S404, credential identifiers associated with all of the created blockchain identifiers are retrieved, and an authentication information list including the credential identifiers may be created.

At step S405, the FIDO blockchain 300 may send the authentication information list to the RP server apparatus 200.

At step S406, the RP server apparatus 200 may create a FIDO registration request message using the authentication information list and a FIDO registration policy.

The FIDO registration policy may include information about the cryptographic algorithm of the user terminal apparatus 100 that is acceptable by the application service, response latency, the connection type of the user terminal apparatus 100, a list of unique identifiers of the user terminal apparatus 100 allowed for registration, and the like.

Here, at step S406, when it creates a FIDO registration request message, the RP server apparatus 200 may set a disallowed user list in the authentication information list.

The disallowed user list may be set so as to include the credential identifiers included in the authentication information list in order to prevent the user terminal apparatus 100 of the same user from being registered again.

At step S407, the RP server apparatus 200 may send the created FIDO registration request message to the user terminal apparatus 100.

At step S408, the user terminal apparatus 100 may perform local authentication of the user.

Here, at step S408, whether the credential identifier created in advance by the user terminal apparatus 100 is included in the authentication information list may be checked.

Here, at step S408, when a credential identifier matching the credential identifier created in advance by the user terminal apparatus 100 is found in the disallowed user list in the authentication information list, it is determined that the user terminal apparatus 100 of the same user is already registered in the FIDO blockchain 300, and thus a FIDO registration request denial message may be created.

Also, at step S408, when a credential identifier matching the credential identifier created in advance by the user terminal apparatus 100 is not found in the disallowed user list in the authentication information list, it is determined that the user terminal apparatus 100 of the user is not registered in the FIDO blockchain 300, and local authentication of the user may be performed.

Here, at step S408, local authentication of the user may be performed using an authentication method supported by the user terminal apparatus 100, such as a biometric authentication method, such as fingerprint recognition, iris recognition, face recognition, or the like, a security token method, or the like.

Here, when local authentication of the user succeeds, the user terminal apparatus 100 may create authentication information (a key pair comprising a new private key and a new public key) of the user at step S408.

Here, at step S408, the new public key, created as the authentication information of the user, may be signed using an inherent private key of the user terminal apparatus 100.

Here, at step S408, a FIDO registration response message, including the new signed public key, the identifier of the new public key (a new credential identifier), and the identification information of the user, may be created.

Here, at step S409, the user terminal apparatus 100 may send the FIDO registration response message to the RP server apparatus 200.

Here, at step S409, when it creates a FIDO registration request denial message, the user terminal apparatus 100 may send the FIDO registration request denial message to the RP server apparatus 200.

At step S410, the RP server apparatus 200 may verify a session and the FIDO registration response message.

Here, at step S410, the RP server apparatus 200 may verify the session information of the received FIDO registration response message through the FIDO protocol processing unit 201.

At step S411, the RP server apparatus 200 may request the FIDO blockchain 300 to verify the FIDO registration response message.

Here, at step S411, the RP server apparatus 200 may call the FIDO registration response verification program 301b of the FIDO blockchain 300, which is capable of verifying the FIDO registration response message and recording the FIDO authentication information of the user in the blockchain database 302.

At step S412, the FIDO registration response verification program 301b may verify the new public key included in the FIDO registration response message.

Here, at step S412, the FIDO registration response verification program 301b may retrieve the metadata information of the user terminal apparatus 100 that created the FIDO registration response message from the blockchain database 302.

For example, at step S412, a metadata statement may be looked up from the metadata information, which is stored in the blockchain database 302, using the unique identifier of the user terminal apparatus 100 in the identification information of the user, which is included in the FIDO registration response message.

Here, at step S412, the inherent public key of the user terminal apparatus 100, corresponding to the unique identifier of the user terminal apparatus 100, may be acquired from the metadata statement.

Here, at step S412, the new public key signed with the inherent private key may be verified using the inherent public key.

Here, at step S412, when the signature of the FIDO registration response message is successfully verified, it may be determined that verification of the FIDO registration response message succeeds.

At step S413, the FIDO authentication information of the user may be recorded in the blockchain database 302.

Here, at step S413, when verification of the new public key included in the FIDO registration response message succeeds, the FIDO registration response verification program 301b may create FIDO authentication information of the user, including the verified new public key, and record the same in the blockchain database 302.

For example, at step S413, a blockchain identifier may be created in the same manner as the method used at step S404.

Here, the blockchain identifier created at step S413 may be the same as the blockchain identifier created at step S404.

Here, at step S413, the blockchain identifier is set as a key, the new credential identifier corresponding thereto is set as a value, and the blockchain identifier and the new credential identifier, set as a key and a value, respectively, may be stored in the blockchain database 302 as the first type of FIDO authentication information of the user.

Here, at step S413, the FIDO authentication information statement of the user, in which the new credential identifier is set as a key and the new public key corresponding thereto is set as a value, may be stored in the blockchain database 302 as the second type of FIDO authentication information of the user.

At step S414, the FIDO blockchain 300 may send a FIDO registration success message to the RP server apparatus 200.

Here, when the new public key for the application service is successfully registered in the blockchain database 302, the FIDO blockchain 300 may send the FIDO registration success message to the RP server apparatus 200.

At step S415, the RP server apparatus 200 may create a blockchain identifier and FIDO authentication information of the user.

Here, at step S415, when it receives the FIDO registration success message from the FIDO registration response verification program 301b, the RP server apparatus 200 may create a blockchain identifier and FIDO authentication information of the user.

Here, at step S415, the RP server apparatus 200 may create a blockchain identifier in the same manner as in the method that was used when the FIDO blockchain 300 created a blockchain identifier at steps S404 and S413.

Here, the blockchain identifier created by the RP server apparatus 200 at step S415 may be the same as the blockchain identifier created by the FIDO blockchain 300 at steps S404 and S413.

Also, at step S415, FIDO authentication information of the user may be created using the blockchain identifier in the same manner as the method used at step S413.

Here, the FIDO authentication information of the user created at step S415 may be the same as that created at step S413.

At step S416, the RP server apparatus 200 may store the blockchain identifier and the FIDO authentication information of the user.

Here, at step S416, the RP server apparatus 200 connects the blockchain identifier with the basic information about the user, thereby storing the same in the user database unit 204.

Here, at step S416, the RP server apparatus 200 connects the FIDO authentication information of the user with the basic information about the user, thereby storing the same in the user database unit 204.

At step S417, the RP server apparatus 200 may send the FIDO registration success message to the user terminal apparatus 100.

Here, at step S417, when the blockchain identifier and the FIDO authentication information of the user are successfully stored in the user database unit 204, the RP server apparatus 200 sends the FIDO registration success message to the user terminal apparatus 100, thereby announcing that the FIDO registration request has been successfully processed.

Figure 10:
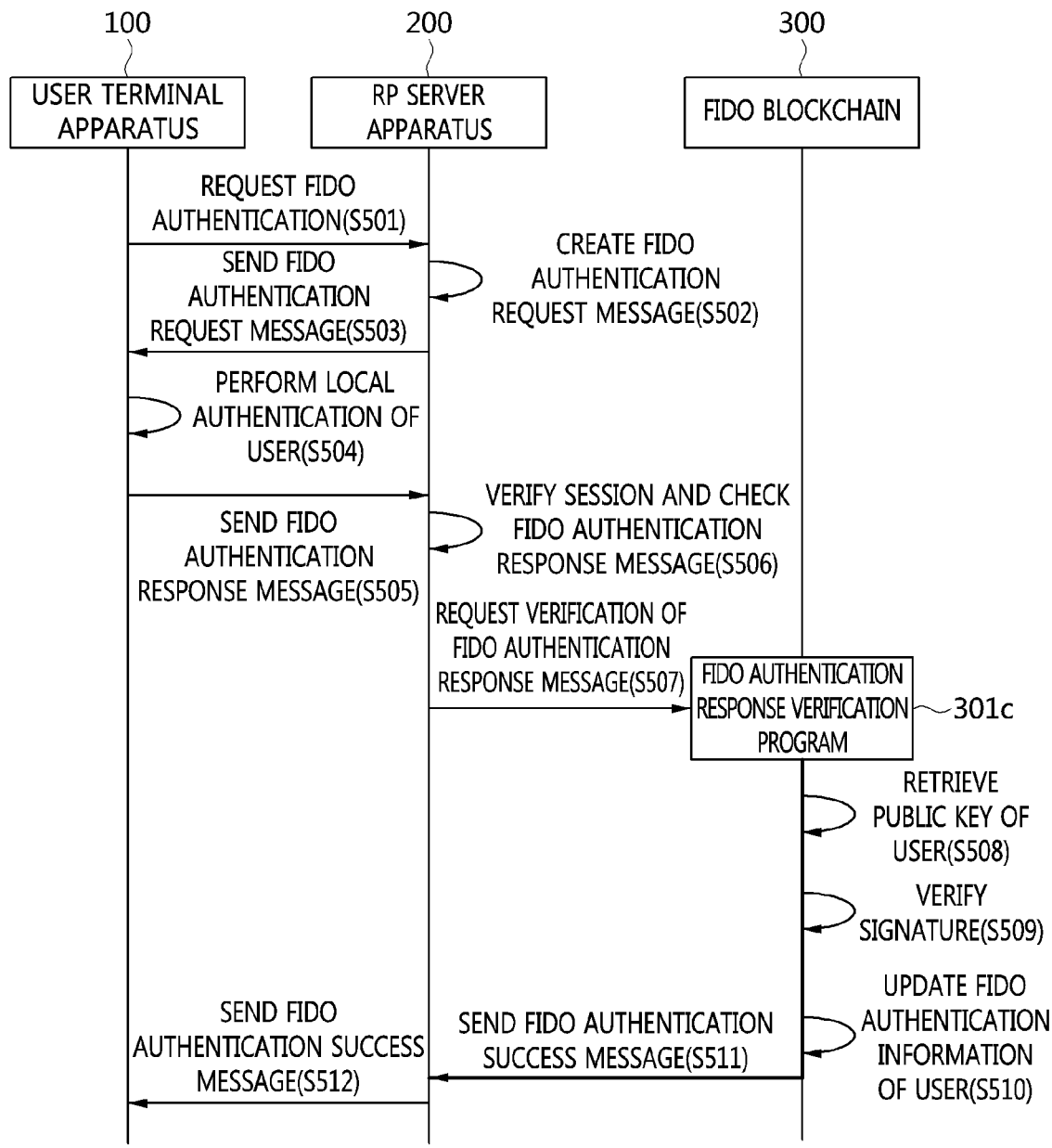
FIG. 10 is a flowchart that shows a FIDO authentication process in a FIDO universal authentication method according to an embodiment of the present invention.

FIG. 10 is a flowchart that shows a FIDO authentication process in a method for FIDO universal authentication according to an embodiment of the present invention.

Referring to FIG. 10, in the FIDO authentication process in a method for FIDO universal authentication according to an embodiment of the present invention, first, a user terminal apparatus 100 may send a request for FIDO authentication to an RP server apparatus 200 at step S501.

That is, because the user terminal apparatus 100 is registered in the RP server apparatus 200 and in a FIDO blockchain 300 through the FIDO registration process described with reference to FIG. 9, the request for FIDO authentication may be sent to the RP server apparatus 200 at step S501 without an additional FIDO registration process.

Then, the RP server apparatus 200 may create a FIDO authentication request message at step S502.

Here, at step S502, a FIDO authentication request message that includes a random challenge value may be created based on a FIDO authentication policy.

The FIDO authentication policy may include information about the cryptographic algorithm of the user terminal apparatus 100 acceptable by the application service, response latency, the connection type of the user terminal apparatus 100, a list of unique identifiers of the user terminal apparatus 100 allowed for authentication, and the like.

At step S503, the RP server apparatus 200 may send the created FIDO authentication request message to the user terminal apparatus 100.

At step S504, the user terminal apparatus 100 may perform local authentication of the user.

Here, at step S504, local authentication of the user may be performed using the authentication method supported by the user terminal apparatus 100, such as a biometric authentication method, such as fingerprint recognition, iris recognition, face recognition, or the like, a security token method, or the like.

Here, when local authentication of the user succeeds, the user terminal apparatus 100 may create an electronic signature at step S504.

For example, when local authentication of the user succeeds, the user terminal apparatus 100 may sign the challenge value included in the FIDO authentication request message using the private key that is associated with the credential identifier created by the user terminal apparatus 100 in the FIDO registration process.

Here, at step S504, when there are multiple credential identifiers created by the user terminal apparatus 100, a list of the credential identifiers may be output to the user, and the user may select one therefrom.

Here, at step S504, an electronic signature in which the challenge value is signed with the private key associated with the credential identifier may be created.

Here, at step S504, a FIDO authentication response message including the credential identifier and the electronic signature may be created.

At step S505, the user terminal apparatus 100 may send the FIDO authentication response message to the RP server apparatus 200.

At step S506, the RP server apparatus 200 may verify a session and the FIDO authentication response message.

Here, at step S506, the RP server apparatus 200 may verify the session information of the FIDO authentication response message and check information that is required for verification of the FIDO authentication response message.

Here, at step S506, the RP server apparatus 200 may verify the session information of the received FIDO authentication response message through the FIDO protocol processing unit 201.

At step S507, the RP server apparatus 200 may request the FIDO blockchain 300 to verify the FIDO authentication response message.

Here, at step S507, the RP server apparatus 200 may call the FIDO authentication response verification program 301c of the FIDO blockchain 300, which is capable of verifying the FIDO authentication response message and updating the FIDO authentication information of the user in the blockchain database 302.

Here, at step S507, the basic information about the user may be acquired from the user database unit 204 included in the RP server apparatus 200 using the identification information of the user, which the user terminal apparatus 100 provided in order to log on to the application service.

The basic information about the user may include at least one of the birthdate, the sex, the name, and the like of the user, which are commonly used in application services provided by other RP server apparatuses 200.

Here, at step S507, the RP server apparatus 200 hashes the basic information about the user, thereby creating a hash value (userHash) thereof.

Here, at step S507, in order to verify the FIDO authentication response message, the hash value (userHash) of the basic information about the user may be provided to the FIDO authentication response verification program 301c along with the FIDO authentication response message.

For example, a hash value (userHash) may be created using the birthdate and sex of the user, which are included in the basic information about the user, and the device identifier of the user terminal apparatus 100 (userHash= (birthdate+sex|deviceID)).

Here, various hash functions, such as SHA256 and the like, may be used as a hash algorithm.

At step S508, the FIDO authentication response verification program 301c may retrieve the public key of the user terminal apparatus 100.

Here, at step S508, the FIDO authentication response verification program 301c may retrieve the FIDO authentication information of the user from the blockchain database 302, and may look up the public key of the user therefrom.

For example, the FIDO authentication information statement of the user may be looked up from the FIDO authentication information of the user using the credential identifier included in the FIDO authentication response message at step S508.

Here, at step S508, the public key of the user terminal apparatus 100, associated with the credential identifier, may be acquired from the FIDO authentication information statement of the user.

At step S509, the FIDO authentication response verification program 301c may verify the signature in the FIDO authentication response message.

Here, at step S509, the electronic signature signed with the private key of the user terminal apparatus 100 may be verified using the public key of the user terminal apparatus 100.

Here, at step S509, when the electronic signature of the FIDO authentication response message is successfully verified, it may be determined that verification of the FIDO authentication response message succeeds.

At step S510, the FIDO authentication response verification program 301c may update the FIDO authentication information of the user.

Here, at step S510, when verification of the electronic signature included in the FIDO authentication response message succeeds, the FIDO authentication response verification program 301c may update the FIDO authentication information of the user recorded in the blockchain database 302.

Here, at step S510, the FIDO authentication response verification program 301c may update the signature counter and the authentication time of the FIDO authentication information of the user.

At step S511, the FIDO blockchain 300 may send a FIDO authentication success message to the RP server apparatus 200.

Here, at step S511, when authentication to the application service is successfully verified by the FIDO blockchain 300, the FIDO blockchain 300 may send a FIDO authentication success message to the RP server apparatus 200.

At step S512, the RP server apparatus 200 may send the FIDO authentication success message to the user terminal apparatus 100.

Here, when it receives the FIDO authentication success message at step S512, the RP server apparatus 200 may confirm that the FIDO authentication request is successfully processed, and may send the FIDO authentication success message to the user terminal apparatus 100.

Figure 11:
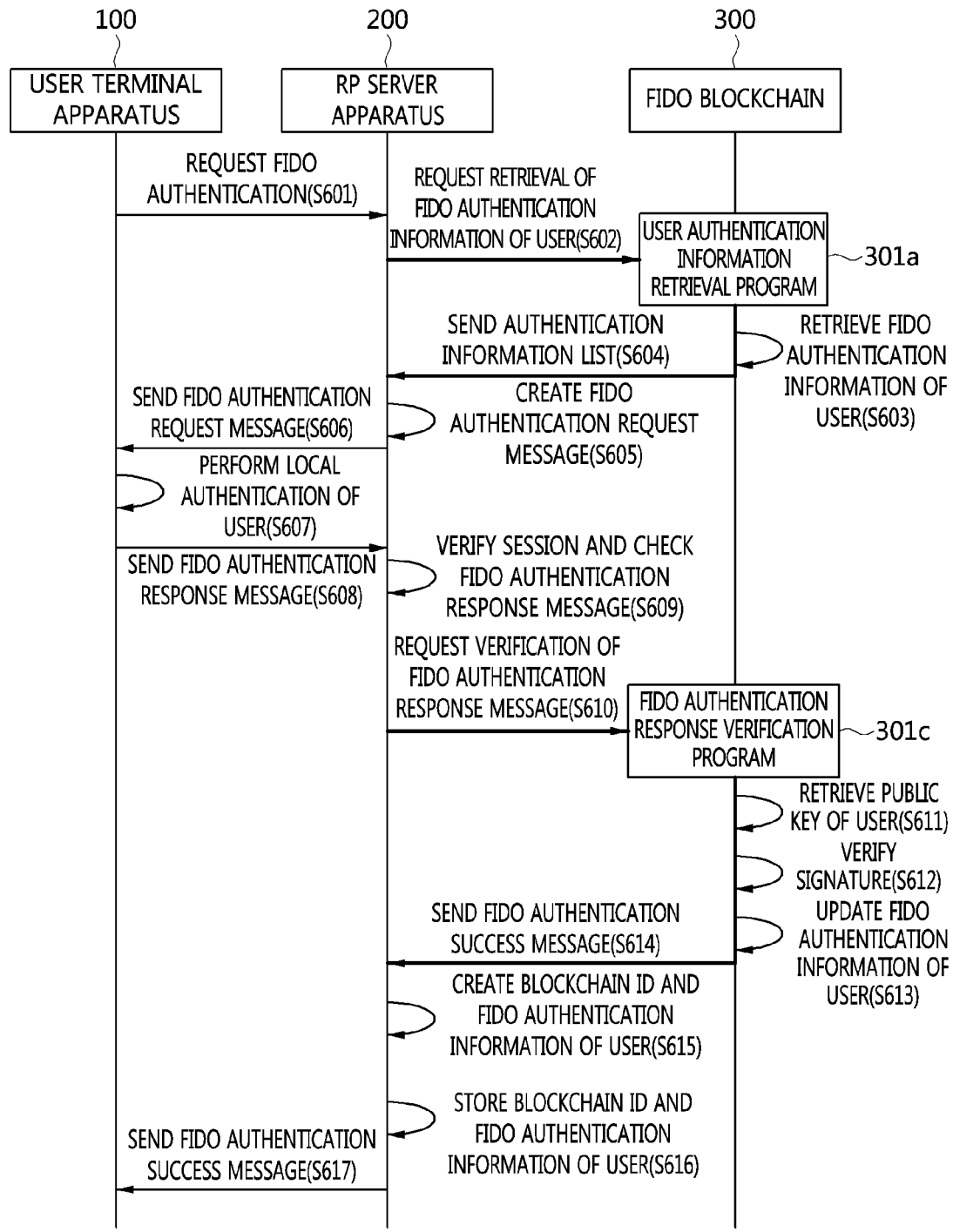
FIG. 11 is a flowchart that shows a FIDO authentication process for an application service for which a user has not signed up in a FIDO universal authentication method according to an embodiment of the present invention.

FIG. 11 is a flowchart that shows a FIDO authentication process for an application service for which a user has not signed up in a method for FIDO universal authentication according to an embodiment of the present invention.

Referring to FIG. 11, in the FIDO authentication process for an application service for which a user has not signed up in a method for FIDO universal authentication according to an embodiment of the present invention, first, a user terminal apparatus 100 may send a request for FIDO authentication to an RP server apparatus 200 at step S601.

The FIDO authentication process for an application service for which a user has not signed up, illustrated in FIG. 11, is for the case in which the FIDO authentication information of the corresponding user is already registered in a FIDO blockchain 300 through another RP server apparatus that provides an application service for which the user terminal apparatus 100 has signed up previously.

Through the FIDO authentication process for an application service for which a user has not signed up, illustrated in FIG. 11, the user terminal apparatus 100 connects the service identifier provided by the RP server apparatus 200 with a blockchain identifier recorded in the FIDO blockchain 300, whereby the user terminal apparatus 100 may be identified.

That is, at step S601, the user terminal apparatus 100 may send a request for FIDO authentication to the RP server apparatus 200.

Here, at step S601, the user terminal apparatus 100 may provide the identification information of the user to the RP server apparatus 200.

The identification information of the user may include at least one of the identifier of the user in a service, the device identifier of the user terminal apparatus 100, and the unique identifier of the user terminal apparatus 100.

The string for requesting the unique identifier of the user terminal apparatus 100 may be defined as 'AAGUID'.

Here, an Authenticator Attestation Globally Unique Identifier (AAGUID) may be a string for requesting the unique identifier of a FIDO-based terminal device provided by FIDO authentication technology.

The unique identifiers of user terminal apparatuses 100 may be stored in advance in the blockchain database 302 of the FIDO blockchain 300 as metadata information.

At step S602, the RP server apparatus 200 may call a user authentication information retrieval program 301a, provided by the FIDO blockchain 300, in order to check whether the user who requested FIDO authentication is a user already registered in the FIDO blockchain 300.

Here, at step S602, basic information about the user, which the user terminal apparatus 100 provided in order to sign up for the application service, is provided to the FIDO blockchain 300, and the user authentication information retrieval program 301a may be called.

The basic information about the user may include at least one of the birthdate, the sex, the name, and the like of the user, which are commonly used in application services provided by other RP server apparatuses 200.

Here, at step S602, the basic information about the user may be acquired from the user database unit 204 included in the RP server apparatus 200 using the identification information of the user, which the user terminal apparatus 100 provided in order to log on to the application service.

At step S603, the user authentication information retrieval program 301a may retrieve the FIDO authentication information of the user, corresponding to the basic information about the user.

The FIDO authentication information of the user may include at least one of a blockchain identifier, the unique identifier of the user terminal apparatus 100, a credential identifier, a public key associated with the credential identifier, a signature counter, a registration time, an authentication time, the type of the credential identifier, information connected with the credential identifier, and the like, which are various kinds of information related to authentication, to be included in a FIDO service response message.

Here, at step S603, the RP server apparatus 200 hashes the basic information about the user, thereby creating a hash value (userHash) thereof.

For example, at step S603, a hash value (userHash) may be created using the birthdate and sex of the user, which are included in the basic information about the user, and the device identifier of the user terminal apparatus 100 (userHash=(birthdate+sex|deviceID)).

Here, various hash functions, such as SHA256 and the like, may be used as a hash algorithm.

Here, at step S603, the RP server apparatus 200 may provide the hash value of the basic information about the user and the string (AAGUID) for requesting the unique identifier of the user terminal apparatus 100 to the user authentication information retrieval program 301a of the FIDO blockchain 300.

Here, at step S603, the user authentication information retrieval program 301a may create an authentication information list corresponding to the basic information about the user.

Here, at step S603, the FIDO blockchain 300 may create a blockchain identifier using the basic information about the user.

For example, at step S603, the FIDO blockchain 300 may create a blockchain identifier using the hash value of the basic information about the user and the string for requesting the unique identifier of the user terminal apparatus 100.

Here, at step S603, unique identifiers matching the string for requesting the unique identifier of the user terminal apparatus 100 may be retrieved from the blockchain database 302 using the string for requesting the unique identifier.

Here, at step S603, one or more blockchain identifiers, the number of which corresponds to the number of unique identifiers, may be created by again hashing the hash value of the basic information about the user using the unique identifiers (blockchainID=(userHash|AAGUID)).

Here, at step S603, credential identifiers associated with all of the created blockchain identifiers are retrieved, and an authentication information list including the credential identifiers may be created.

At step S604, the FIDO blockchain 300 may send the authentication information list to the RP server apparatus 200.

At step S605, the RP server apparatus 200 may create a FIDO authentication request message using the authentication information list and a FIDO authentication policy.

Here, at step S605, a FIDO authentication request message that includes a random challenge value may be created based on a FIDO authentication policy.

The FIDO authentication policy may include information about the cryptographic algorithm of the user terminal apparatus 100 acceptable by the application service, response latency, the connection type of the user terminal apparatus 100, a list of unique identifiers of the user terminal apparatus 100 allowed for authentication, and the like.

Here, at step S605, the RP server apparatus 200 may create a FIDO authentication request message by setting an allowed user list in the authentication information list.

The allowed user list may be set so as to include credential identifiers included in the authentication information list in order to allow authentication using only the user terminal apparatus 100 of the same user.

At step S606, the RP server apparatus 200 may send the created FIDO authentication request message to the user terminal apparatus 100.

At step S607, the user terminal apparatus 100 may perform local authentication of the user.

Here, at step S607, whether the credential identifier created in advance by the user terminal apparatus 100 is included in the authentication information list may be checked.

Here, at step S607, when a credential identifier matching the credential identifier created in advance by the user terminal apparatus 100 is not found in the allowed user list in the authentication information list, it is determined that the user terminal apparatus 100 of the user is not registered in the FIDO blockchain 300, and thus a FIDO authentication request denial message may be created.

Conversely, at step S607, when a credential identifier matching the credential identifier created in advance by the user terminal apparatus 100 is found in the allowed user list in the authentication information list, it is determined that the user terminal apparatus 100 of the user is registered in the FIDO blockchain 300, and local authentication of the user may be performed.

Here, at step S607, local authentication of the user may be performed using the authentication method supported by the user terminal apparatus 100, such as a biometric authentication method, such as fingerprint recognition, iris recognition, face recognition, or the like, a security token method, or the like.

Here, when local authentication of the user succeeds, the user terminal apparatus 100 may create an electronic signature at step S607.

For example, when local authentication of the user succeeds, the user terminal apparatus 100 may sign the challenge value included in the FIDO authentication request message using the private key that is associated with the credential identifier found in the allowed user list in the authentication information list.

Here, at step S607, an electronic signature in which the challenge value is signed with the private key associated with the credential identifier may be created.

Here, at step S607, a FIDO authentication response message, including the credential identifier and the electronic signature, may be created.

At step S608, the user terminal apparatus 100 may send the FIDO authentication response message to the RP server apparatus 200.

At step S609, the RP server apparatus 200 may verify a session and the FIDO authentication response message.

Here, at step S609, the RP server apparatus 200 may verify the session information of the FIDO authentication response message and check information that is required for verification of the FIDO authentication response message.

Here, at step S609, the RP server apparatus 200 may verify the session information of the received FIDO authentication response message through the FIDO protocol processing unit 201.

Here, at step S610, the RP server apparatus 200 may request the FIDO blockchain 300 to verify the FIDO authentication response message.

Here, at step S610, the RP server apparatus 200 may call the FIDO authentication response verification program 301c of the FIDO blockchain 300, which is capable of verifying the FIDO authentication response message and updating the FIDO authentication information of the user in the blockchain database 302.

Here, at step S610, the basic information about the user may be acquired from the user database unit 204 included in the RP server apparatus 200 using the identification information of the user, which the user terminal apparatus 100 provided in order to log on to the application service.

The basic information about the user may include at least one of the birthdate, the sex, the name, and the like of the user, which are commonly used in application services provided by other RP server apparatuses 200.

Here, at step S610, the RP server apparatus 200 hashes the basic information about the user, thereby creating a hash value (userHash) thereof.

Here, at step S610, in order to verify the FIDO authentication response message, the hash value (userHash) of the basic information about the user may be provided to the FIDO authentication response verification program 301c along with the FIDO authentication response message.

For example, a hash value (userHash) may be created using the birthdate and sex of the user, which are included in the basic information about the user, and the device identifier of the user terminal apparatus 100 (userHash= (birthdate+sex|deviceID)) at step S610.

Here, various hash functions, such as SHA256 and the like, may be used as a hash algorithm.

At step S611, the FIDO authentication response verification program 301c may retrieve the public key of the user terminal apparatus 100.

Here, at step S611, the FIDO authentication response verification program 301c may retrieve the FIDO authentication information of the user from the blockchain database 302 and look up the public key of the user from the FIDO authentication information of the user.

For example, the FIDO authentication information statement of the user may be looked up from the FIDO authentication information of the user using the credential identifier included in the FIDO authentication response message at step S611.

Here, at step S611, the public key of the user terminal apparatus 100, associated with the credential identifier, may be acquired from the FIDO authentication information statement of the user.

At step S612, the FIDO authentication response verification program 301c may verify the signature in the FIDO authentication response message.

Here, at step S612, the electronic signature signed with the private key of the user terminal apparatus 100 may be verified using the public key of the user terminal apparatus 100.

Here, when the electronic signature of the FIDO authentication response message is successfully verified at step S612, it is determined that verification of the FIDO authentication response message succeeds.

At step S613, the FIDO authentication response verification program 301c may update the FIDO authentication information of the user.

Here, at step S613, when verification of the electronic signature included in the FIDO authentication response message succeeds, the FIDO authentication response verification program 301c may update the FIDO authentication information of the user recorded in the blockchain database 302.

Here, at step S613, the FIDO authentication response verification program 301c may update the signature counter and the authentication time of the FIDO authentication information of the user.

At step S614, the FIDO blockchain 300 may send a FIDO authentication success message to the RP server apparatus 200.

Here, at step S614, when authentication to the application service is successfully verified by the FIDO blockchain 300, the FIDO blockchain 300 may send a FIDO authentication success message to the RP server apparatus 200.

Here, at step S614, the FIDO authentication success message that includes the updated signature counter and the updated authentication time of the FIDO authentication information may be sent.

At step S615, the RP server apparatus 200 may create a blockchain identifier and FIDO authentication information of the user.

Here, at step S615, when it receives the FIDO authentication success message from the FIDO authentication response verification program 301c, the RP server apparatus 200 may create a blockchain identifier and FIDO authentication information of the user.

Here, at step S615, the RP server apparatus 200 may create a blockchain identifier in the same manner as the method that was used when the FIDO blockchain 300 created a blockchain identifier at step S603.

Here, the blockchain identifier created by the RP server apparatus 200 at step S615 may be the same as the blockchain identifier created by the FIDO blockchain 300 at step S603.

Also, at step S615, FIDO authentication information of the user may be created using the blockchain identifier in the same manner as the method used at step S603.

Here, at step S615, FIDO authentication information of the user that includes the blockchain identifier, the credential identifier, and the public key associated with the credential identifier (the FIDO authentication information statement of the user) may be created.

Here, FIDO authentication information of the user may be created such that the updated signature counter and the updated authentication time, included in the FIDO authentication success message, are incorporated in the FIDO authentication information statement.

Here, the FIDO authentication information of the user created at step S615 may be of the same type as the FIDO authentication information stored in the blockchain database 302.

At step S616, the RP server apparatus 200 may store the blockchain identifier and the FIDO authentication information of the user.

Here, at step S616, the RP server apparatus 200 connects the blockchain identifier with the basic information about the user, thereby storing the same in the user database unit 204.

Here, at step S616, the RP server apparatus 200 connects the FIDO authentication information of the user with the basic information about the user, thereby storing the same in the user database unit 204.

At step S617, the RP server apparatus 200 may send a FIDO authentication success message to the user terminal apparatus 100.

Here, when it receives the FIDO authentication success message at step S617, the RP server apparatus 200 may confirm that the FIDO authentication request is successfully processed, and may send the FIDO authentication success message to the user terminal apparatus 100.

Through the above-described FIDO authentication process for an application service for which a user has not signed up, the user terminal apparatus 100 may perform FIDO authentication merely by providing the identification information of the user to the RP server apparatus 200 without the need to sign up for the application service or to log on thereto.

Figure 12:
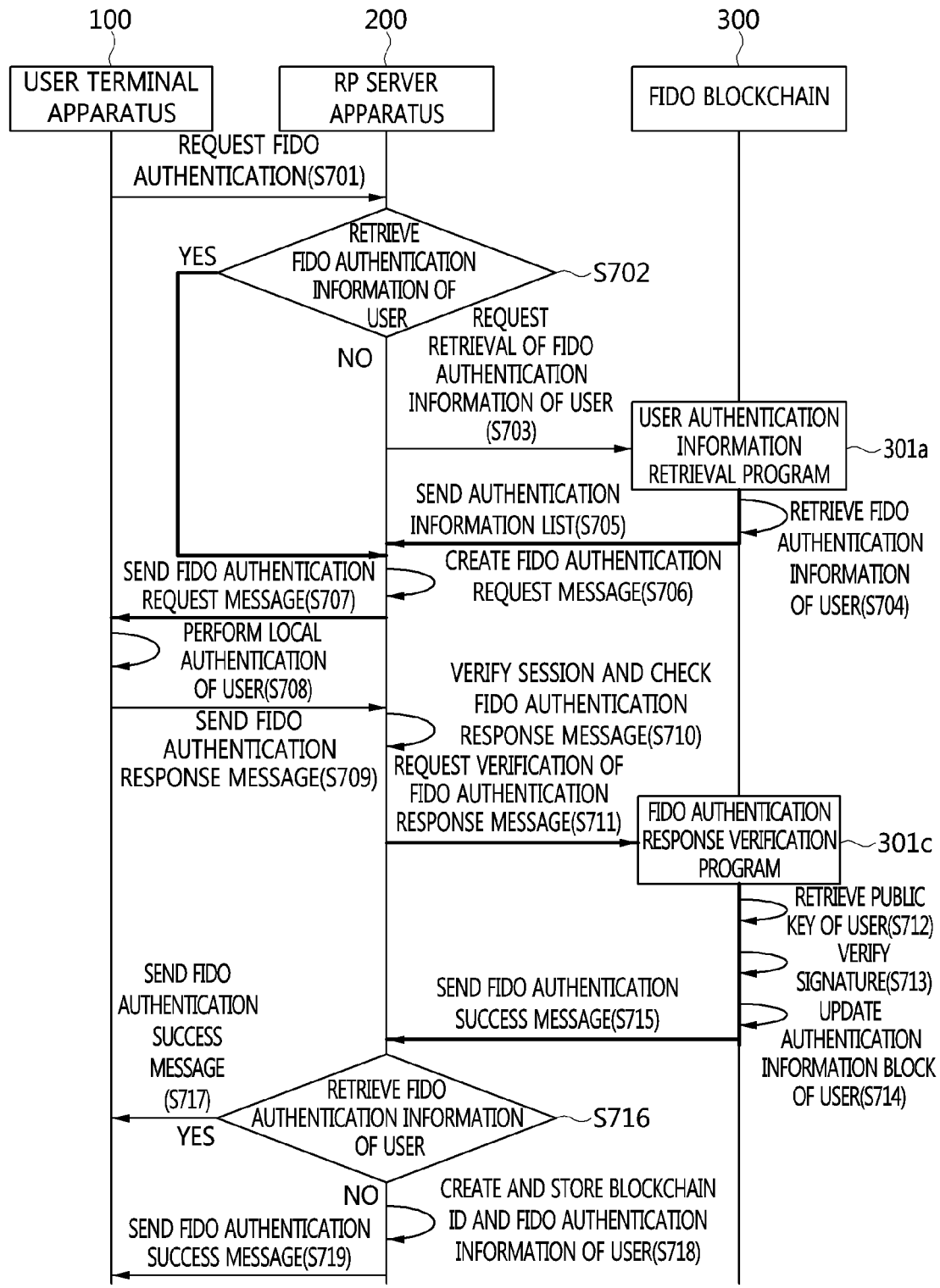
FIG. 12 is a flowchart that shows a FIDO authentication process using previously stored basic information about a user in a FIDO universal authentication method according to an embodiment of the present invention.

FIG. 12 is a flowchart that shows a FIDO authentication process using previously stored basic information about a user in a method for FIDO universal authentication according to an embodiment of the present invention.

Referring to FIG. 12, in the FIDO authentication process using previously stored basic information about a user in a method for FIDO universal authentication according to an embodiment of the present invention, first, a user terminal apparatus 100 may send a request for FIDO authentication to an RP server apparatus 200 at step S701.

The FIDO authentication process using previously stored basic information about a user, illustrated in FIG. 12, is for the case in which the FIDO authentication information of the user is registered in a FIDO blockchain 300 but there is no information about whether a user terminal apparatus 100 signs up for an application service provided by the RP server apparatus 200.

Through the FIDO authentication process using previously stored basic information about a user, illustrated in FIG. 12, the user terminal apparatus 100 may be identified using the FIDO authentication information of the user stored in the RP server apparatus 200 without retrieving the FIDO authentication information of the user from the FIDO blockchain 300.

That is, the user terminal apparatus 100 may send a request for FIDO authentication to the RP server apparatus 200 at step S701 without an additional FIDO registration process.

Here, at step S701, the user terminal apparatus 100 may provide the identification information of the user to the RP server apparatus 200.

The identification information of the user may include at least one of the identifier of the user in the service, the device identifier of the user terminal apparatus 100, and the unique identifier of the user terminal apparatus 100.

The string for requesting the unique identifier of the user terminal apparatus 100 may be defined as 'AAGUID'.

Here, an Authenticator Attestation Globally Unique Identifier (AAGUID) may be a string for requesting the unique identifier of a FIDO-based terminal device provided by FIDO authentication technology.

The unique identifiers of user terminal apparatuses 100 may be stored in advance in the blockchain database 302 of a FIDO blockchain 300 as metadata information.

At step S702, the RP server apparatus 200 may check whether the FIDO authentication information of the user is stored in the user database unit 204.

Here, at step S702, basic information about the user is retrieved using the identification information of the user, and the user database unit 204 may be searched using the basic information about the user.

The basic information about the user may include at least one of the birthdate, the sex, the name, and the like of the user, which are commonly used in application services provided by other RP server apparatuses 200.

Here, at step S702, the basic information about the user may be acquired from the user database unit 204 included in the RP server apparatus 200 using the identification information of the user, which the user terminal apparatus 100 provided in order to log on to the application service.

Here, at step S702, when a blockchain identifier and FIDO authentication of the user, connected with the basic information about the user, are found in the user database unit 204, a FIDO authentication request message may be created using the FIDO authentication information of the user at step S706.

Here, at step S702, the RP server apparatus 200 may retrieve credential identifiers, associated with the blockchain identifier, from the FIDO authentication information of the user using the blockchain identifier, and create an authentication information list including the credential identifiers.

The FIDO authentication information of the user may include at least one of a blockchain identifier, the unique identifier of the user terminal apparatus 100, a credential identifier, a public key associated with the credential identifier, a signature counter, a registration time, an authentication time, the type of the credential identifier, information connected with the credential identifier, and the like, which are various kinds of information related to authentication to be included in a FIDO service response message.

Also, at step S702, when the FIDO authentication information of the user is not found in the user database unit 204, the RP server apparatus 200 may request the FIDO blockchain 300 to retrieve FIDO authentication information of the user at step S703.

At step S704, a user authentication information retrieval program 301a may retrieve the FIDO authentication information of the user, corresponding to the basic information about the user.

Here, at step S704, the RP server apparatus 200 hashes the basic information about the user, thereby creating a hash value (userHash) thereof.

For example, at step S704, a hash value (userHash) may be created using the birthdate and sex of the user, included in the basic information about the user, and the device identifier of the user terminal apparatus 100 (userHash=(birthdate+sex|deviceID)).

Here, various hash functions, such as SHA256 and the like, may be used as a hash algorithm.

Here, at step S704, the RP server apparatus 200 may provide the hash value of the basic information about the user and the string (AAGUID) for requesting the unique identifier of the user terminal apparatus 100 to the user authentication information retrieval program 301*a* of the FIDO blockchain 300.

Here, at step S704, the user authentication information retrieval program 301*a* may create an authentication information list corresponding to the basic information about the user.

Here, at step S704, the FIDO blockchain 300 may create a blockchain identifier using the basic information about the user.

For example, at step S704, the FIDO blockchain 300 may create a blockchain identifier using the hash value of the basic information about the user and the string for requesting the unique identifier of the user terminal apparatus 100.

Here, at step S704, unique identifiers matching the string for requesting the unique identifiers of the user terminal apparatus may be retrieved from the blockchain database 302 using the string for requesting the unique identifiers.

Here, at step S704, one or more blockchain identifiers, the number of which corresponds to the number of unique identifiers, may be created by again hashing the hash value of the basic information about the user using the unique identifiers (blockchainID=(userHash|AAGUID)).

Here, at step S704, credential identifiers associated with all of the created blockchain identifiers are retrieved, and an authentication information list including the credential identifiers may be created.

At step S705, the FIDO blockchain 300 may send the authentication information list to the RP server apparatus 200.

At step S706, the RP server apparatus 200 may create a FIDO authentication request message using the authentication information list and a FIDO authentication policy.

Here, a FIDO authentication request message including a random challenge value may be created based on the FIDO authentication policy.

The FIDO authentication policy may include information about the cryptographic algorithm of the user terminal apparatus 100 acceptable by the application service, response latency, the connection type of the user terminal apparatus 100, a list of unique identifiers of the user terminal apparatus 100 allowed for authentication, and the like.

Here, at step S706, the RP server apparatus 200 may create a FIDO authentication request message by setting an allowed user list in the authentication information list.

The allowed user list may be set so as to include the credential identifiers included in the authentication information list in order to allow authentication using only the user terminal apparatus 100 of the same user.

At step S707, the RP server apparatus 200 may send the created FIDO authentication request message to the user terminal apparatus 100.

At step S708, the user terminal apparatus 100 may perform local authentication of the user.

Here, at step S708, whether the credential identifier created in advance by the user terminal apparatus 100 is included in the authentication information list may be checked.

Here, at step S708, when a credential identifier matching the credential identifier created in advance by the user terminal apparatus 100 is not found in the allowed user list in the authentication information list, it is determined that the user terminal apparatus 100 of the user is not registered in the FIDO blockchain 300, and a FIDO authentication request denial message may be created.

Also, at step S708, when a credential identifier matching the credential identifier created in advance by the user terminal apparatus 100 is found in the allowed user list in the authentication information list, it is determined that the user terminal apparatus 100 of the user is registered in the FIDO blockchain 300, and local authentication of the user may be performed.

Here, at step S708, local authentication of the user may be performed using the authentication method supported by the user terminal apparatus 100, such as a biometric authentication method, such as fingerprint recognition, iris recognition, face recognition, or the like, a security token method, or the like.

Here, when local authentication of the user succeeds, the user terminal apparatus 100 may create an electronic signature at step S708.

For example, when local authentication of the user succeeds, the user terminal apparatus 100 may sign the challenge value, which is included in the FIDO authentication request message, with a private key associated with the credential identifier found in the allowed user list in the authentication information list.

Here, at step S708, an electronic signature in which the challenge value is signed using the private key associated with the credential identifier may be created.

Here, at step S708, a FIDO authentication response message including the credential identifier and the electronic signature may be created.

At step S709, the user terminal apparatus 100 may send the FIDO authentication response message to the RP server apparatus 200.

At step S710, the RP server apparatus 200 may verify a session and the FIDO authentication response message.

Here, at step S710, the RP server apparatus 200 may verify the session information of the FIDO authentication response message and check information that is required for verification of the FIDO authentication response message.

Here, at step S710, the RP server apparatus 200 may verify the session information of the received FIDO authentication response message through the FIDO protocol processing unit 201.

At step S711, the RP server apparatus 200 may request the FIDO blockchain 300 to verify the FIDO authentication response message.

Here, at step S711, the RP server apparatus 200 may call the FIDO authentication response verification program 301*c* of the FIDO blockchain, which is capable of verifying the FIDO authentication response message and updating the FIDO authentication information of the user in the blockchain database 302.

Here, at step S711, basic information about the user may be acquired from the user database unit 204 included in the RP server apparatus 200 using the identification information of the user, which the user terminal apparatus 100 provided in order to log on to the application service.

The basic information about the user may include at least one of the birthdate, the sex, the name, and the like of the user, which are commonly used in application services provided by other RP server apparatuses 200.

Here, at step S711, the RP server apparatus 200 hashes the basic information about the user, thereby creating a hash value (userHash) thereof.

Here, at step S711, the hash value (userHash) of the basic information about the user may be provided to the FIDO authentication response verification program 301*c* along with the FIDO authentication response message in order to verify the FIDO authentication response message.

For example, at step S711, a hash value (userHash) may be created using the birthdate and sex of the user, included in the basic information about the user, and the device identifier of the user terminal apparatus 100 (userHash=(birthdate+sex|deviceID)).

Here, various hash functions, such as SHA256 and the like, may be used as a hash algorithm.

At step S712, the FIDO authentication response verification program 301c may retrieve the public key of the user terminal apparatus 100.

Here, at step S712, the FIDO authentication response verification program 301c may retrieve the FIDO authentication information of the user from the blockchain database 302 and retrieve the public key of the user therefrom.

For example, at step S712, the FIDO authentication information statement of the user may be looked up from the FIDO authentication information of the user using the credential identifier included in the FIDO authentication response message.

Here, at step S712, the public key of the user terminal apparatus 100, associated with the credential identifier, may be acquired from the FIDO authentication information statement of the user.

At step S713, the FIDO authentication response verification program 301c may verify the signature of the FIDO authentication response message.

Here, at step S713, the electronic signature signed with the private key of the user terminal apparatus 100 may be verified using the public key of the user terminal apparatus 100.

Here, when the electronic signature of the FIDO authentication response message is successfully verified at step S713, it may be determined that verification of the FIDO authentication response message succeeds.

At step S714, the FIDO authentication response verification program 301c may update the FIDO authentication information of the user.

Here, at step S714, when verification of the electronic signature included in the FIDO authentication response message succeeds, the FIDO authentication response verification program 301c may update the FIDO authentication information of the user recorded in the blockchain database 302.

Here, at step S714, the FIDO authentication response verification program 301c may update the signature counter and the authentication time of the FIDO authentication information of the user.

At step S715, the FIDO blockchain 300 may send a FIDO authentication success message to the RP server apparatus 200.

Here, at step S715, when authentication to the application service is successfully verified by the FIDO blockchain 300, the FIDO blockchain 300 may send a FIDO authentication success message to the RP server apparatus 200.

Here, at step S715, the FIDO authentication success message, including the updated signature counter and the updated authentication time of the FIDO authentication information of the user, may be sent.

At step S716, the RP server apparatus 200 may check whether FIDO authentication information of the user was found.

Here, when FIDO authentication information of the user was found in the user database unit 204 at step S702, the RP server apparatus 200 may send the received FIDO authentication success message to the user terminal apparatus 100 at step S717. On the other hand, when the FIDO authentication information of the user was not found in the user database unit 204 at step S702, the RP server apparatus 200 may create a blockchain identifier and FIDO authentication information of the user and store the same at step S718.

At step S717, the RP server apparatus 200 may send the FIDO authentication success message to the user terminal apparatus 100.

Here, at step S717, when it receives the FIDO authentication success message, the RP server apparatus 200 may confirm that the FIDO authentication request is successfully processed, and may then send the FIDO authentication success message to the user terminal apparatus 100.

At step S718, the RP server apparatus 200 may create and store a blockchain identifier and FIDO authentication information of the user.

Here, at step S718, when it receives the FIDO authentication success message from the FIDO authentication response verification program 301c, the RP server apparatus 200 may create a blockchain identifier and FIDO authentication information of the user.

Here, at step S718, the RP server apparatus 200 may create a blockchain identifier in the same manner as the method that was used when the FIDO blockchain 300 created a blockchain identifier at step S704.

Here, the blockchain identifier created by the RP server apparatus 200 at step S718 may be the same as the blockchain identifier created by the FIDO blockchain 300 at step S704.

Also, at step S718, FIDO authentication information of the user may be created using the blockchain identifier.

Here, at step S718, FIDO authentication information of the user that includes the blockchain identifier, the credential identifier, and the public key associated with the credential identifier (the FIDO authentication information statement of the user) may be created.

Here, at step S718, FIDO authentication information of the user may be created such that the updated signature counter and the updated authentication time, included in the FIDO authentication success message, are incorporated in the FIDO authentication information statement of the user.

Here, the FIDO authentication information of the user created at step S718 may be of the same type as the FIDO authentication information of the user stored in the blockchain database 302.

Here, at step S718, the RP server apparatus 200 may store the blockchain identifier and the FIDO authentication information of the user.

Here, at step S718, the RP server apparatus 200 connects the blockchain identifier with the basic information about the user, thereby storing the same in the user database unit 204.

Here, at step S718, the RP server apparatus 200 connects the FIDO authentication information of the user with the basic information about the user, thereby storing the same in the user database unit 204.

At step S719, the RP server apparatus 200 may send a FIDO authentication success message to the user terminal apparatus 100.

Here, at step S719, when it receives the FIDO authentication success message, the RP server apparatus 200 may confirm that the FIDO authentication request is successfully processed, and may then send the FIDO authentication success message to the user terminal apparatus 100.

Through the above-described FIDO authentication process using previously stored basic information about a user, the user terminal apparatus 100 may perform FIDO authentication merely by providing the identification information of the user to the RP server apparatus 200 without the need to sign up for or log on to the application service for which the user terminal apparatus 100 has not signed up.

Also, even though the user terminal apparatus 100 has not signed up for an application service, once FIDO authentication with the application service is performed, the RP server apparatus 200 stores the FIDO authentication information connected with the basic information about the user in the user database unit 204. Accordingly, without the need to retrieve the FIDO authentication information of the user from the FIDO blockchain 300, the RP server apparatus 200 may quickly process FIDO authentication by itself.

Figure 13:
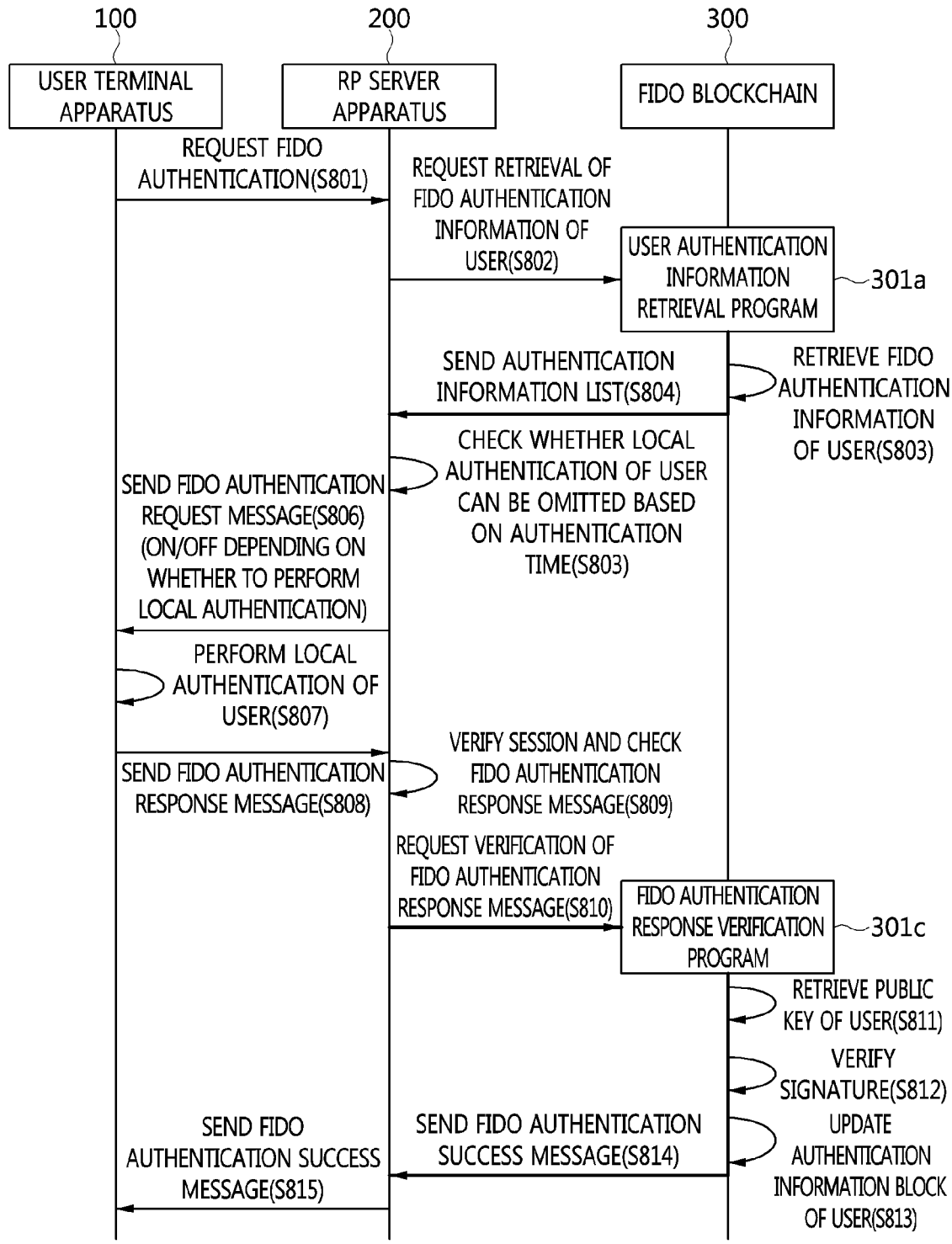
FIG. 13 is a flowchart that shows an easy authentication process in a FIDO universal authentication method according to an embodiment of the present invention.

FIG. 13 is a flowchart that shows a FIDO easy authentication process in a method for FIDO universal authentication according to an embodiment of the present invention.

Referring to FIG. 13, in the FIDO easy authentication process in a method for FIDO universal authentication according to an embodiment of the present invention, first, a user terminal apparatus 100 may send a request for FIDO authentication to an RP server apparatus 200 at step S801.

That is, at step S801, the user terminal apparatus 100 may send a request for FIDO authentication to the RP server apparatus 200 without an additional FIDO registration process.

Here, at step S801, the user terminal apparatus 100 may provide the RP server apparatus 200 with the identification information of a user.

The identification information of the user may include at least one of the identifier of the user in a service, the device identifier of the user terminal apparatus 100, and the unique identifier of the user terminal apparatus 100.

The string for requesting the unique identifier of the user terminal apparatus 100 may be defined as 'AAGUID'.

Here, an Authenticator Attestation Globally Unique Identifier (AAGUID) may be a string for requesting the unique identifier of a FIDO-based terminal device provided by FIDO authentication technology.

The unique identifiers of user terminal apparatuses 100 may be stored in advance in the blockchain database 302 of a FIDO blockchain 300 as metadata information.

At step S802, the RP server apparatus 200 may call a user authentication information retrieval program 301a, which is provided by the FIDO blockchain 300, in order to check whether the user who requested FIDO authentication is already registered in the FIDO blockchain 300.

Here, at step S802, basic information about the user, which the user terminal apparatus 100 provided in order to sign up for the application service, is provided to the FIDO blockchain 300, and the user authentication information retrieval program 301a may be called.

The basic information about the user may include at least one of the birthdate, the sex, the name, and the like of the user, which are commonly used in application services provided by other RP server apparatuses 200.

Here, at step S802, the basic information about the user may be acquired from the user database unit 204 included in the RP server apparatus 200 using the identification information of the user, which the user terminal apparatus 100 provided in order to log on to the application service.

At step S803, the user authentication information retrieval program 301a may retrieve FIDO authentication information of the user, corresponding to the basic information about the user.

The FIDO authentication information of the user may include at least one of a blockchain identifier, the unique identifier of the user terminal apparatus 100, a credential identifier, a public key associated with the credential identifier, a signature counter, a registration time, an authentication time, the type of the credential identifier, information connected with the credential identifier, and the like, which are various kinds of information related to authentication to be included in a FIDO service response message.

Here, at step S803, the RP server apparatus 200 hashes the basic information about the user, thereby creating a hash value (userHash) thereof.

For example, at step S803, a hash value (userHash) may be created using the birthdate and sex of the user, which are included in the basic information about the user, and the device identifier of the user terminal apparatus 100 (userHash=(birthdate+sex|deviceID)).

Here, various hash functions, such as SHA256 and the like, may be used as a hash algorithm.

Here, at step S803, the RP server apparatus 200 may provide the hash value of the basic information about the user and the string (AAGUID) for requesting the unique identifier of the user terminal apparatus 100 to the user authentication information retrieval program 301a of the FIDO blockchain 300.

Here, at step S803, the user authentication information retrieval program 301a may create an authentication information list corresponding to the basic information about the user.

Here, at step S803, the FIDO blockchain 300 may create a blockchain identifier using the basic information about the user.

For example, at step S803, the FIDO blockchain 300 may create a blockchain identifier using the hash value of the basic information about the user and the string for requesting the unique identifier of the user terminal apparatus 100.

Here, at step S803, unique identifiers matching the string for requesting the unique identifier of the user terminal apparatus 100 may be retrieved from the blockchain database 302 using the string for requesting the unique identifier.

Here, at step S803, one or more blockchain identifiers, the number of which corresponds to the number of unique identifiers, may be created by again hashing the hash value of the basic information about the user using the unique identifiers (blockchainID=(userHash|AAGUID)).

Here, at step S803, credential identifiers associated with all of the created blockchain identifiers may be retrieved, and an authentication information list including the credential identifiers may be created.

At step S804, the FIDO blockchain 300 may send the authentication information list to the RP server apparatus 200.

Here, the authentication information list may include the authentication time at which the user terminal apparatus 100 is authenticated using the credential identifier in the FIDO authentication information of the user.

At step S805, the RP server apparatus 200 may check whether the authentication time at which the user terminal apparatus 100 is authenticated falls within a time range within which local authentication can be omitted.

Here, at step S805, when the authentication time falls within the time range within which local authentication of the user can be omitted, a FIDO authentication request message in which omission of local authentication of the user is specified may be created. Conversely, when the authentication time falls out of the time range within which local authentication of the user can be omitted, a FIDO authentication request message in which local authentication of the user is specified may be created.

Here, at step S805, the RP server apparatus 200 may set an allowed user list using the retrieved FIDO authentication information of the user when it creates a FIDO authentication request message.

At step S805, the RP server apparatus 200 may create a FIDO authentication request message using the authentication information list and the FIDO authentication policy.

Here, at step S805, a FIDO authentication request message including a random challenge value may be created using the FIDO authentication policy.

The FIDO authentication policy may include information about the cryptographic algorithm of the user terminal apparatus 100 acceptable by the application service, response latency, the connection type of the user terminal apparatus 100, a list of unique identifiers of the user terminal apparatus 100 allowed for authentication, and the like.

Here, at step S805, the RP server apparatus 200 may create a FIDO authentication request message by setting an allowed user list in the authentication information list.

The allowed user list may be set so as to include the credential identifiers included in the authentication information list in order to allow authentication using only the user terminal apparatus 100 of the same user.

Here, at step S806, the RP server apparatus 200 may send the FIDO authentication request message in which whether to perform local authentication of the user is specified to the user terminal apparatus 100.

At step S806, the RP server apparatus 200 may send the created FIDO authentication request message to the user terminal apparatus 100.

At step S807, the user terminal apparatus 100 may perform local authentication of the user.

Here, at step S807, when it receives the FIDO authentication request message in which local authentication of the user is specified, the user terminal apparatus 100 may perform local authentication of the user. Conversely, when it receives the FIDO authentication request message in which omission of local authentication of the user is specified, the user terminal apparatus 100 may skip local authentication.

Here, at step S807, whether the credential identifier previously created by the user terminal apparatus 100 is included in the authentication information list may be checked.

Here, at step S807, when a credential identifier matching the credential identifier previously created by the user terminal apparatus 100 is not found in the allowed user list in the authentication information list, it may be determined that the user terminal apparatus 100 of the user is not registered in the FIDO blockchain 300, and a FIDO authentication request denial message may be created.

Also, at step S807, when a credential identifier matching the credential identifiers previously created by the user terminal apparatus 100 is found in the allowed user list in the authentication information list, it may be determined that the user terminal apparatus 100 of the user is registered in the FIDO blockchain 300, and local authentication of the user may be performed or skipped depending on the information about whether to perform local authentication.

Here, at step S807, local authentication of the user may be performed using the authentication method supported by the user terminal apparatus 100, such as a biometric authentication method, such as fingerprint recognition, iris recognition, face recognition, or the like, a security token method, or the like.

Here, at step S807, the user terminal apparatus 100 may create an electronic signature when the credential identifier is found in the authentication information list.

For example, at step S807, when the credential identifier is found in the authentication information list, the user terminal apparatus 100 may sign the challenge value included in the FIDO authentication request message using the private key associated with the credential identifier found in the allowed user list in the authentication information list.

Here, at step S807, an electronic signature in which the challenge value is signed using the private key associated with the credential identifier may be created.

Here, at step S807, a FIDO authentication response message that includes information ('True' or 'False') about whether local authentication of the user is performed, the credential identifier, and the electronic signature may be created.

At step S808, the user terminal apparatus 100 may send the FIDO authentication response message to the RP server apparatus 200.

At step S809, the RP server apparatus 200 may verify a session and the FIDO authentication response message.

Here, at step S809, the RP server apparatus 200 may verify the session information of the FIDO authentication response message and check information that is required for verification of the FIDO authentication response message.

Here, at step S809, the RP server apparatus 200 may verify the session information of the received FIDO authentication response message through the FIDO protocol processing unit 201.

At step S810, the RP server apparatus 200 may request the FIDO blockchain 300 to verify the FIDO authentication response message.

Here, at step S810, the RP server apparatus 200 may call the FIDO authentication response verification program 301c of the FIDO blockchain 300, which is capable of verifying the FIDO authentication response message and updating the FIDO authentication information of the user in the blockchain database 302.

Here, at step S810, basic information about the user may be acquired from the user database unit 204 included in the RP server apparatus 200 using the identification information of the user, which the user terminal apparatus 100 provided in order to log on to the application service.

The basic information about the user may include at least one of the birthdate, the sex, the name, and the like of the user, which are commonly used in application services provided by other RP server apparatuses 200.

Here, at step S810, the RP server apparatus 200 hashes the basic information about the user, thereby creating a hash value (userHash) thereof.

Here, at step S810, the hash value (userHash) of the basic information about the user may be provided to the FIDO authentication response verification program 301c along with the FIDO authentication response message in order to verify the FIDO authentication response message.

For example, at step S810, a hash value (userHash) may be created using the birthdate and sex of the user, which are included in the basic information about the user, and the device identifier of the user terminal apparatus 100 (userHash=(birthdate+sex|deviceID)).

Here, various hash functions, such as SHA256 and the like, may be used as a hash algorithm.

At step S811, the FIDO authentication response verification program 301c may retrieve the public key of the user terminal apparatus 100.

Here, at step S811, the FIDO authentication response verification program 301c may retrieve the FIDO authentication information of the user from the blockchain database 302, and the public key of the user terminal apparatus 100 may be retrieved therefrom.

For example, at step S811, the FIDO authentication information statement of the user may be looked up from the FIDO authentication information using the credential identifier included in the FIDO authentication response message.

Here, at step S811, the public key of the user terminal apparatus 100 associated with the credential identifier may be acquired from the FIDO authentication information statement of the user.

At step S812, the FIDO authentication response verification program 301c may verify the signature in the FIDO authentication response message.

Here, at step S812, the electronic signature signed with the private key of the user terminal apparatus 100 may be verified using the public key of the user terminal apparatus 100.

Here, at step S812, when the electronic signature of the FIDO authentication response message is successfully verified, it may be determined that verification of the FIDO authentication response message succeeds.

At step S813, the FIDO authentication response verification program 301c may update the FIDO authentication information of the user.

Here, at step S813, when verification of the electronic signature included in the FIDO authentication response message succeeds, the FIDO authentication response verification program 301c may update the FIDO authentication information of the user recorded in the blockchain database 302.

Here, at step S813, the FIDO authentication response verification program 301c may update the signature counter and the authentication time of the FIDO authentication information of the user.

Here, at step S813, the authentication time may be updated to the current time only when the information about whether local authentication of the user is performed, which is received from the RP server apparatus 200, is 'True'.

At step S814, the FIDO blockchain 300 may send a FIDO authentication success message to the RP server apparatus 200.

Here, at step S814, when authentication to the application service is successfully verified by the FIDO blockchain 300, the FIDO blockchain 300 may send a FIDO authentication success message to the RP server apparatus 200.

At step S815, the RP server apparatus 200 may send the FIDO authentication success message to the user terminal apparatus 100.

Here, at step S815, when it receives the FIDO authentication success message, the RP server apparatus 200 may confirm that the FIDO authentication request is successfully processed, and may then send the FIDO authentication success message to the user terminal apparatus 100.

Figure 14:
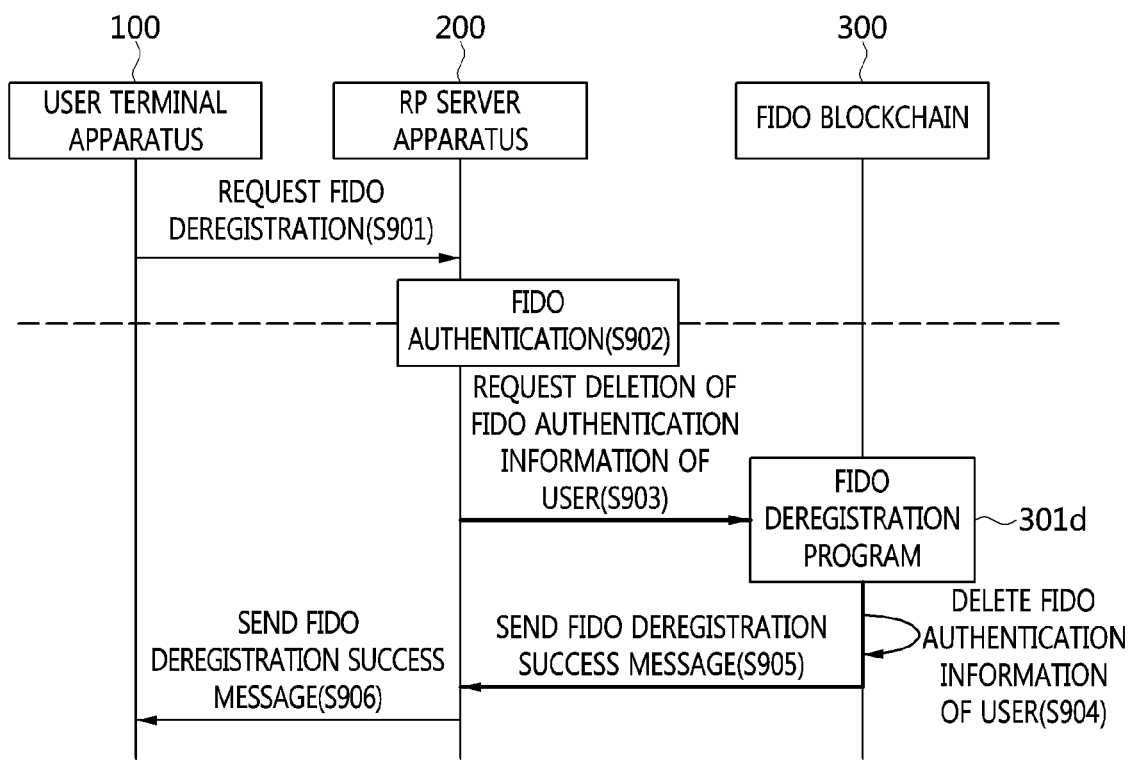
FIG. 14 is a flowchart that shows a FIDO deregistration process in a FIDO universal authentication method according to an embodiment of the present invention.

FIG. 14 is a flowchart that shows a FIDO deregistration process in a method for FIDO universal authentication according to an embodiment of the present invention.

Referring to FIG. 14, in the FIDO deregistration process in a method for FIDO universal authentication according to an embodiment of the present invention, first, a user terminal apparatus 100 may request the RP server apparatus 200 to deregister itself from a FIDO blockchain at step S901.

That is, at step S901, when the user terminal apparatus 100 logs on to the RP server apparatus 200, the identification information of a user is provided thereto, and a request for FIDO deregistration may be made.

At step S902, the FIDO authentication process illustrated in FIGS. 10 to 13 may be performed between the user terminal apparatus 100, the RP server apparatus 200, and the FIDO blockchain 300.

At step S903, the RP server apparatus 200 may request the FIDO deregistration program 301d of the FIDO blockchain 300 to delete the FIDO authentication information of the user.

Here, at step S903, the RP server apparatus 200 may call the FIDO deregistration program 301d of the FIDO blockchain 300, which is capable of deleting the FIDO authentication information of the user.

At step S904, the FIDO deregistration program 301d may delete the FIDO authentication information of the user from the blockchain database 302.

Here, at step S904, the FIDO authentication information of the user may be deleted from the blockchain database 302 using the blockchain identifier and the credential identifier of the user terminal apparatus 100, which are provided from the RP server apparatus 200.

Here, at step S904, the blockchain identifier is set as a key, and the list of credential identifiers, which is the value corresponding to the key, may be deleted.

Here, at step S904, the credential identifier is set as a key, and the public key associated with the credential identifier, which is the FIDO authentication information statement of the user, may be deleted.

At step S905, the FIDO deregistration program 301d may send a FIDO deregistration success message to the RP server apparatus 200.

Here, at step S905, when the FIDO authentication information for the application service is successfully deleted from the FIDO blockchain 300, the FIDO blockchain 300 may send the FIDO deregistration success message to the RP server apparatus 200.

At step S906, the RP server apparatus 200 may send the FIDO deregistration success message to the user terminal apparatus 100.

Here, at step S906, when it receives the FIDO deregistration success message, the RP server apparatus 200 may confirm that the FIDO deregistration is successfully processed, and may then send the FIDO deregistration success message to the user terminal apparatus 100.

Figure 15:
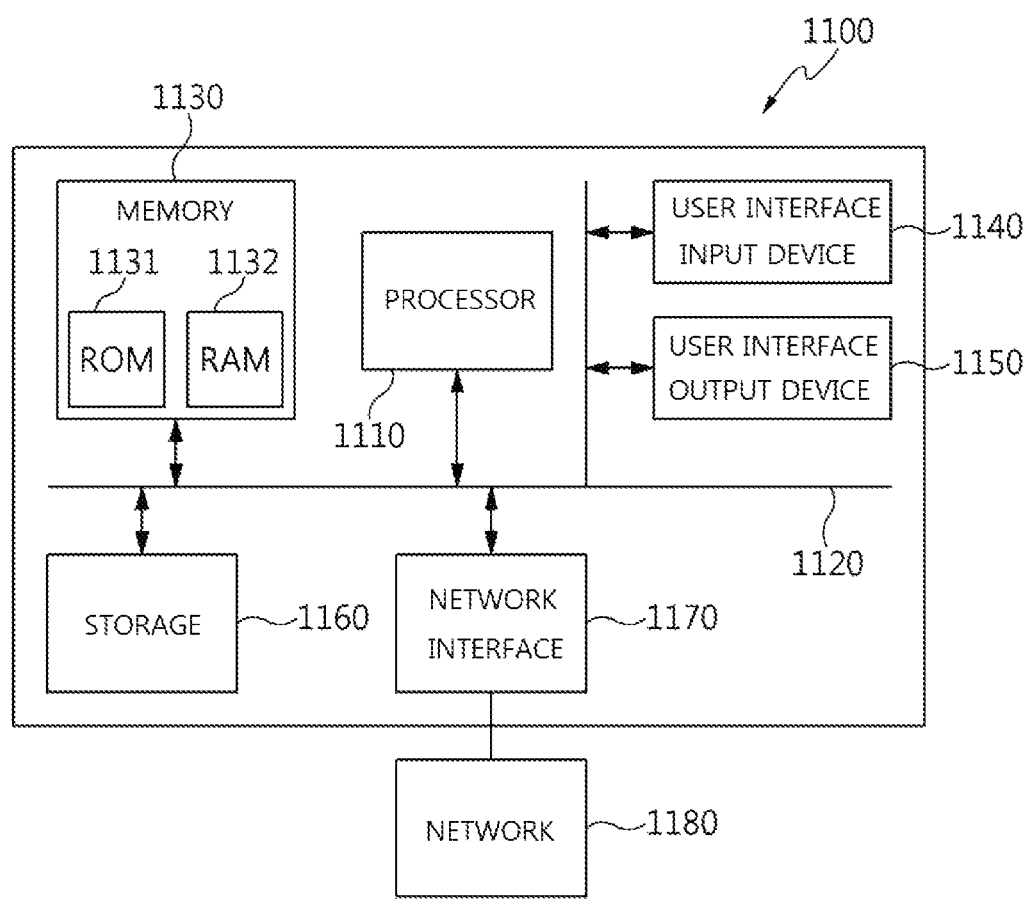
FIG. 15 is a view that shows a computer system according to an embodiment of the present invention.

FIG. 15 is a view that shows a computer system according to an embodiment of the present invention.

Referring to FIG. 15, the user terminal apparatus 100 and the RP server apparatus 200 according to an embodiment of the present invention may be implemented in a computer system 1100 including a computer-readable recording medium. As illustrated in FIG. 15, the computer system 1100 may include at least one processor 1110, memory 1130, a user-interface input device 1140, a user-interface output device 1150 and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

The present invention enables application services of multiple domains to securely share and use FIDO authentication information of a user without any trusted third party.

Also, the present invention may provide FIDO authentication of a user in all application services without any additional FIDO registration process once the user performs a FIDO registration process.

Also, the present invention may reduce the expenses of maintaining the server of a service provider that provides an application service and security management cost through FIDO registration and authentication processes using a FIDO blockchain.

Also, the present invention may enable respective application services to provide individual FIDO registration and authentication policies.

Also, the present invention may enable the FIDO authentication information of a user to be trusted by all nodes using a FIDO blockchain without a trusted third party.

Also, the present invention may create added value by sharing FIDO authentication information of users between application services through a FIDO blockchain.

As described above, the terminal apparatus, the server apparatus, and the method for FIDO universal authentication using a blockchain according to the present invention are not limitedly applied to the configurations and operations of the above-described embodiments, but all or some of the embodiments may be selectively combined and configured, so that the embodiments may be modified in various ways.

What is claimed is:

1. A method for Fast Identity Online (FIDO) universal authentication using a terminal apparatus, a server apparatus, and a blockchain, comprising:
   sending, by the terminal apparatus, a FIDO service request for any one of FIDO registration, FIDO authentication, and FIDO deregistration for an application service provided by the server apparatus to the server apparatus;
   verifying, by the blockchain, a FIDO service response message, which is created as a result of local authentication of a user in the terminal apparatus in response to the FIDO service request; and
   processing, by the server apparatus, the FIDO service request based on whether the FIDO service response message is successfully verified by the blockchain,
   wherein the verifying of the FIDO service response message is configured such that, when the FIDO service request is a request for the FIDO authentication or the FIDO deregistration and when a credential identifier thereof is included in an authentication information list that includes credential identifiers associated with the identification information of the user, the terminal apparatus performs local authentication of the user, creates an electronic signature signed with a private key associated with the credential identifier, and creates the FIDO service response message, including the electronic signature and the credential identifier, and
   wherein the processing of the FIDO service request is configured such that the blockchain acquires information that is required for verifying second information included in the FIDO service response message from a blockchain database using first information included in the FIDO service response message and verifies the FIDO service response message by verifying the second information using the acquired information.

2. The method of claim 1, wherein sending the FIDO service request is configured such that the server apparatus requests the blockchain to retrieve FIDO authentication information of the user, corresponding to the terminal apparatus, by providing basic information about the user, which the terminal apparatus provides in order to sign up for the application service, to the blockchain.

3. The method of claim 2, wherein sending the FIDO service request is configured such that the server apparatus acquires the basic information about the user from a user database, which is included in the server apparatus, using identification information of the user, which the terminal apparatus provides in order to log on to the application service.

4. The method of claim 3, wherein sending the FIDO service request is configured such that the server apparatus retrieves the FIDO authentication information of the user from the user database when it is determined that the FIDO authentication information of the user is stored therein using the identification information of the user, and such that the server apparatus requests the blockchain to retrieve the FIDO authentication information of the user only when it is determined that the FIDO authentication information is not stored in the user database.

5. The method of claim 4, wherein sending the FIDO service request is configured such that the blockchain creates a blockchain identifier using the basic information about the user.

6. The method of claim 5, wherein sending the FIDO service request is configured such that the blockchain retrieves the FIDO authentication information of the user from the blockchain database and creates an authentication information list that includes credential identifiers associated with the blockchain identifier, which are acquired from the FIDO authentication information of the user.

7. The method of claim 6, wherein sending the FIDO service request is configured such that the server apparatus retrieves the FIDO authentication information of the user from the user database and creates the authentication information list that includes the credential identifiers associated with the identification information of the user, which are acquired from the FIDO authentication information of the user.

8. The method of claim 7, wherein verifying the FIDO service response message is configured such that the terminal apparatus checks whether the credential identifier thereof is included in the authentication information list, performs local authentication of the user, and creates information based on a type of the FIDO service request and on a result of checking whether the credential identifier is included in the authentication information list.

9. The method of claim 8, wherein verifying the FIDO service response message is configured such that, when the FIDO service request is a request for FIDO registration and when the credential identifier is not included in the authentication information list, the terminal apparatus performs local authentication of the user, creates a new public key, signs the new public key with an inherent private key of the terminal apparatus, and creates the FIDO service response message, including the new public key and the identification information of the user.

10. The method of claim 1, wherein the blockchain database stores metadata information, which is previously provided from the terminal apparatus, as two types and stores the FIDO authentication information of the user as two types.

11. The method of claim 10, wherein:
   the blockchain database stores a string for requesting a unique identifier of the terminal apparatus and a list of unique identifiers matching the string, which are set as a key and a value, respectively, as a first type of metadata information; and the blockchain database stores a unique identifier of the terminal apparatus and an inherent public key of the terminal apparatus corresponding to the unique identifier, which are set as a key and a value, respectively, as a second type of metadata information.

12. The method of claim 11, wherein:
the blockchain database stores the blockchain identifier and a list of credential identifiers corresponding to the blockchain identifier, which are set as a key and a value, respectively, as a first type of the FIDO authentication information of the user; and
the blockchain database stores the credential identifier and a public key of the terminal apparatus corresponding to the credential identifier, which are set as a key and a value, respectively, as a second type of the FIDO authentication information of the user.

13. The method of claim 1, further comprising:
creating, by the server apparatus, a blockchain identifier corresponding to the terminal apparatus when verification of the FIDO service response message succeeds.

14. The method of claim 13, wherein creating the blockchain identifier is configured such that the server apparatus creates the blockchain identifier using basic information about the user, which the terminal apparatus provides to the server apparatus in order to sign up for the application service.

15. The method of claim 14, wherein creating the blockchain identifier is configured such that the server apparatus connects the blockchain identifier with the basic information about the user, which is used to create the blockchain identifier, thereby storing the blockchain identifier in a user database included in the server apparatus.

16. The method of claim 15, further comprising:
after creating the blockchain identifier,
processing, by the server apparatus, the FIDO service request from the terminal apparatus through the blockchain using the blockchain identifier.

17. A terminal apparatus, comprising:
one or more processors for:
sending a Fast Identity Online (FIDO) service request for any one of FIDO registration, FIDO authentication, and FIDO deregistration for an application service provided by a server apparatus to the server apparatus; and
performing local authentication of a user in order to enable the server apparatus to process the FIDO service request,
wherein the server apparatus requests a blockchain to verify a FIDO service response message, which is created as a result of local authentication of the user, and processes the FIDO service request based on a result of verification of the FIDO service response message,
wherein the verifying of the FIDO service response message is configured such that, when the FIDO service request is a request for the FIDO authentication or the FIDO deregistration and when a credential identifier thereof is included in an authentication information list that includes credential identifiers associated with the identification information of the user, the one or more processors perform local authentication of the user, create an electronic signature signed with a private key associated with the credential identifier, and create the FIDO service response message, including the electronic signature and the credential identifier, and
wherein the processing of the FIDO service request is configured such that the blockchain acquires information that is required for verifying second information included in the FIDO service response message from a blockchain database using first information included in the FIDO service response message and verifies the FIDO service response message by verifying the second information using the acquired information.

18. A server apparatus, comprising:
one or more processors for:
requesting a terminal apparatus to perform local authentication of a user in order to process a Fast Identity Online (FIDO) service request from the terminal apparatus, the FIDO service request being for any one of FIDO registration, FIDO authentication, and FIDO deregistration for an application service provided to the terminal apparatus; and
requesting a blockchain to verify a FIDO service response message, which is created as a result of local authentication of the user, and processing the FIDO service request based on a result of verification of the FIDO service response message,
wherein the verifying of the FIDO service response message is configured such that, when the FIDO service request is a request for the FIDO authentication or the FIDO deregistration and when a credential identifier thereof is included in an authentication information list that includes credential identifiers associated with the identification information of the user, the terminal apparatus performs local authentication of the user, creates an electronic signature signed with a private key associated with the credential identifier, and creates the FIDO service response message, including the electronic signature and the credential identifier, and
wherein the processing of the FIDO service request is configured such that the blockchain acquires information that is required for verifying second information included in the FIDO service response message from a blockchain database using first information included in the FIDO service response message and verifies the FIDO service response message by verifying the second information using the acquired information.

\* \* \* \* \*